US011892848B2

(12) United States Patent
Zimmermann

(10) Patent No.: US 11,892,848 B2
(45) Date of Patent: *Feb. 6, 2024

(54) METHOD, ROBOT AND SYSTEM FOR INTERACTING WITH ACTORS OR ITEM RECIPIENTS

(71) Applicant: STARSHIP TECHNOLOGIES OÜ, Tallinn (EE)

(72) Inventor: Markus Zimmermann, Helsinki (FI)

(73) Assignee: STARSHIP TECHNOLOGIES OÜ, Tallinn (EE)

( * ) Notice: Subject to any disclaimer, the term of this patent is extended or adjusted under 35 U.S.C. 154(b) by 73 days.

This patent is subject to a terminal disclaimer.

(21) Appl. No.: 17/607,891

(22) PCT Filed: May 12, 2020

(86) PCT No.: PCT/EP2020/063154
§ 371 (c)(1),
(2) Date: Oct. 31, 2021

(87) PCT Pub. No.: WO2020/229451
PCT Pub. Date: Nov. 19, 2020

(65) Prior Publication Data
US 2022/0221870 A1 Jul. 14, 2022

(30) Foreign Application Priority Data
May 16, 2019 (EP) .................................. 19174878

(51) Int. Cl.
*B25J 9/16* (2006.01)
*G05D 1/02* (2020.01)
*B25J 11/00* (2006.01)
(52) U.S. Cl.
CPC ........ *G05D 1/0214* (2013.01); *B25J 11/0005* (2013.01); *G05D 2201/0211* (2013.01)

(58) Field of Classification Search
CPC ........... G05D 1/0214; G05D 2201/0211; B25J 11/008; B25J 11/0005; B25J 9/1676; G05B 2219/40202
See application file for complete search history.

(56) References Cited

U.S. PATENT DOCUMENTS

| 4,549,841 A | 10/1985 | Ishige |
| 5,664,928 A | 9/1997 | Stauber |

(Continued)

FOREIGN PATENT DOCUMENTS

| CN | 109571502 A | 4/2019 |
| WO | 2011035839 | 3/2011 |

(Continued)

OTHER PUBLICATIONS

Tius et al., Human Heuristics for a Team of Mobile Robots, 2007, IEEE, pp. 122-129 (Year: 2007).*

(Continued)

*Primary Examiner* — Mcdieunel Marc
(74) *Attorney, Agent, or Firm* — Siritzky Law, PLLC

(57) ABSTRACT

A method for interactions during encounters between a mobile robot and an actor, a mobile robot configured for execution of delivery tasks in an outdoor environment, and a use of the mobile robot. The method comprises the mobile robot traveling on a pedestrian pathway; detecting an actor by the mobile robot via a sensor system; identifying a situation associated with the detected actor; in response to the identified situation, determining an action to execute by the mobile robot, and executing the determined action by the mobile robot. The mobile robot comprises a navigation component configured for at least partially autonomous navigation in an outdoor environment; a sensor system configured for collecting sensor data during an encounter between the mobile robot and an actor; a processing component configured to process the sensor data and output (Continued)

actions for the mobile robot to perform; and an output component configured for executing actions determined by the processing component.

20 Claims, 11 Drawing Sheets

(56) References Cited

U.S. PATENT DOCUMENTS

| | | | |
|---|---|---|---|
| 5,942,869 A | | 8/1999 | Katou et al. |
| 6,467,293 B1 | | 10/2002 | Goosman |
| 6,602,037 B2 | | 8/2003 | Winkler |
| 7,073,634 B2 | | 7/2006 | Mitchell et al. |
| 7,320,289 B1 | | 1/2008 | Clarke et al. |
| 7,894,939 B2 | | 2/2011 | Zini et al. |
| 7,931,431 B2 | | 4/2011 | Benedict et al. |
| 8,010,230 B2 | | 8/2011 | Zini et al. |
| 8,104,601 B2 | | 1/2012 | Hayduchok et al. |
| 8,204,624 B2 | | 6/2012 | Zini et al. |
| 8,485,285 B2 | | 7/2013 | Ferrigni |
| 8,874,360 B2 | | 10/2014 | Klinger et al. |
| 8,948,914 B2 | | 2/2015 | Zini et al. |
| 9,020,632 B2 | | 4/2015 | Naylor |
| 9,031,692 B2 | | 5/2015 | Zhu |
| 9,244,147 B1 | | 1/2016 | Soundararajan et al. |
| 9,256,852 B1 | | 2/2016 | Myllymaki |
| 9,266,675 B2 | | 2/2016 | Yamashita |
| 9,373,149 B2 | | 6/2016 | Abhyanker |
| 9,557,740 B2 | | 1/2017 | Crawley |
| 9,561,941 B1 | | 2/2017 | Watts |
| 9,694,976 B1 | | 7/2017 | Wurman et al. |
| 9,741,010 B1 | | 8/2017 | Heinla |
| 9,744,672 B2 | | 8/2017 | Sun et al. |
| 9,844,879 B1 | | 12/2017 | Cousins et al. |
| 9,906,159 B2* | | 2/2018 | Harkin .................... H02M 1/08 |
| 10,005,609 B1* | | 6/2018 | Biene ...................... B65D 81/38 |
| 10,239,378 B2* | | 3/2019 | Liivik .................. G05D 1/0238 |
| 10,282,995 B2* | | 5/2019 | Heinla ................. G08G 1/0104 |
| 10,800,221 B2* | | 10/2020 | Liivik ....................... B60K 1/02 |
| 11,227,497 B2* | | 1/2022 | Heinla ................... G08G 1/161 |
| 11,238,594 B2* | | 2/2022 | Raag ................... G06V 20/588 |
| 11,250,741 B2* | | 2/2022 | Liivik ...................... G09F 17/00 |
| 11,577,573 B2* | | 2/2023 | Liivik ....................... B60G 5/01 |
| 2003/0165373 A1 | | 9/2003 | Felder et al. |
| 2005/0207876 A1 | | 9/2005 | Springwater |
| 2006/0237239 A1 | | 10/2006 | Bruner et al. |
| 2012/0090110 A1 | | 4/2012 | Van Den Berg et al. |
| 2013/0110281 A1 | | 5/2013 | Jones et al. |
| 2013/0332021 A1 | | 12/2013 | Goren |
| 2014/0136414 A1 | | 5/2014 | Abhyanker |
| 2014/0254896 A1 | | 9/2014 | Zhou et al. |
| 2014/0365258 A1 | | 12/2014 | Vestal et al. |
| 2015/0006005 A1 | | 1/2015 | Yu et al. |
| 2015/0045945 A1 | | 2/2015 | Zini et al. |
| 2015/0100152 A1 | | 4/2015 | Barragan Trevino et al. |
| 2015/0183581 A1 | | 7/2015 | Worsley |
| 2015/0379468 A1 | | 12/2015 | Harvey |
| 2016/0185466 A1 | | 6/2016 | Dreano, Jr. |
| 2016/0207710 A1 | | 7/2016 | Conrad et al. |
| 2016/0325928 A1 | | 11/2016 | Lepek et al. |
| 2016/0355337 A1 | | 12/2016 | Lert et al. |
| 2016/0368464 A1 | | 12/2016 | Hassounah |
| 2017/0017237 A1 | | 1/2017 | Tokuyama et al. |
| 2017/0100837 A1 | | 4/2017 | Zevenbergen et al. |
| 2017/0185853 A1 | | 6/2017 | Yokota et al. |
| 2017/0220981 A1 | | 8/2017 | Shucker et al. |
| 2017/0267452 A1 | | 9/2017 | Goren et al. |
| 2018/0020896 A1 | | 1/2018 | High et al. |
| 2018/0349834 A1 | | 12/2018 | Heinla et al. |
| 2019/0244525 A1* | | 8/2019 | Heinla ................. G05D 1/0088 |
| 2020/0111333 A1 | | 4/2020 | Liivik et al. |
| 2020/0159245 A1* | | 5/2020 | Raag ..................... G05D 1/0251 |
| 2021/0197712 A1* | | 7/2021 | Korjus ................. B60Q 1/5035 |
| 2021/0209367 A1* | | 7/2021 | Korjus .................... G06V 20/58 |
| 2022/0050473 A1* | | 2/2022 | Pärnpuu ................. B25J 13/003 |
| 2022/0063108 A1* | | 3/2022 | Viilup .................... B25J 11/008 |
| 2022/0139226 A1* | | 5/2022 | Heinla ................... G08G 1/161 |
| | | | 701/23 |
| 2023/0117848 A1* | | 4/2023 | Ferenets ............... G01S 13/931 |
| | | | 342/70 |

FOREIGN PATENT DOCUMENTS

| | | |
|---|---|---|
| WO | 2018005911 A1 | 1/2018 |
| WO | 2018206514 A1 | 11/2018 |
| WO | 2019088990 A1 | 5/2019 |

OTHER PUBLICATIONS

Bischoff et al., HERMES—a versatile personal robotic assistant, 2004, IEEE, pp. 1759-1779 (Year: 2004).*

Weiss et al., Robots asking for directions—The willingness of passers-by to support robots, 2010, IEEE, pp. 23-30 (Year: 2010).*

Millan, Rapid, safe, and incremental learning of navigation strategies, 1996, IEEE, pp. 408-420 (Year: 1996).*

Loper et al., Mobile human-robot teaming with environmental tolerance, 2009, IEEE, pp. 157-163 (Year: 2009).*

Pauly et al., Monitoring indoor environments using intelligent mobile sensors, 1998, IEEE, pp. 2198-2203 (Year: 1998).*

Tijus et al., Human Heuristics for a Team of Mobile Robots, 2007, IEEE, pp. 122-129 (Year: 2007).*

Smith et al., Enhanced situational awareness in autonomous mobile robots using context-based mapping (Oct. 2012), 2013, IEEE, p. (Year: 2013).*

Anonymous, "Lieferroboter Starship: Klauen wurde ich ihn nicht-Auto—Tagesspiegel," Nov. 29, 2015, retrieved from the Internet, URL: http://www.tagesspiegel.de/mobil/lieferroboter-starship-klauen-wuerd- e-ich-ihn-nicht/12647114.html.

Baker, "Automated Street Crossing for Assistive Robots," Proceedings of the 2005 IEEE, Jun. 28-Jul. 1, 2005.

Pettitt, Jeniece, "Forget delivery drones, meet your new delivery robot," Nov. 2, 2015, retrieved from the Internet, URL: https://www.cnbc.com/2015/11/02/forget-delivery-drones-meet-your-new-delivery-robot.html.

Ju, W. The Design of Implicit Interactions. in Synthesis Lectures on Human-Centered Informatics #28, Edited by J. M. Carroll. Morgan Claypool Publishers, Mar. 2015.

McDonald, C.: Forget the Robot Apocalypse. Order Lunch. California Magazine, Feb. 26, 2018.

Kruse Thibault et al, "Human-aware robot navigation: A survey", Robotics and Autonomous Systems, vol. 61, No. 12, Dec. 1, 2013, pp. 1726-1743.

Weiss Astrid et al, "Transferring Human-Human Interaction Studies to HRI Scenarios in Public Space", Sep. 5, 2011, Pervasive: International Conference on Pervasive Computing; [Lecture Notes in Computer Science; Lect.Notes Computer], Springer, Berlin, Heidelberg, pp. 230-247.

Aniket Bera et al, "The Emotionally Intelligent Robot: Improving Social Navigation in Crowded Environments", arxiv.org, Cornell University Library, 201 OLIN Library Cornell University Ithaca, NY 14853, Mar. 8, 2019.

WIPO, Written Opinion of the International Searching Authority, for PCT/EP2020/063154, dated Nov. 19, 2020 (7p.).

WIPO, International Search Report, for PCT/EP2020/063154, dated Nov. 19, 2020 (4p.).

Eibl & Zimmermann: D3CoS: Designing Dynamic Distributed Cooperative Human-Machine Systems: 12.9 DP-UI-MOD: Information Modality, Feb. 11, 2014 (pp. 175-182).

\* cited by examiner

METHOD, ROBOT AND SYSTEM FOR INTERACTING WITH ACTORS OR ITEM RECIPIENTS

RELATED APPLICATIONS

This application is the National Stage (a 371) of International Application No. PCT/EP2020/063154, filed May 12, 2020, the entire contents of which are hereby fully incorporated herein by reference for all purposes. PCT/EP2020/063154 claims the priority benefit of European patent application 19174878.9, filed May 16, 2019, the entire contents of which are hereby fully incorporated herein by reference for all purposes.

FIELD

The present invention generally relates to mobile robots and their behavior towards other actors. More specifically, the present invention relates to methods and systems for communication between mobile robots and other actors.

INTRODUCTION

The use of mobile robots in various areas of daily life is increasing rapidly. Autonomous or partially autonomous robots are navigating both indoors and outdoors. The encounter with other actors results in a range of reactions which may lead to obstruction and/or damage of the mobile robot and may delay the completion of the mobile robot's task or completely prevent the successful execution.

In order to increase the efficiency of the mobile robot and minimize waiting times for customers and/or users, the robot may need to interact with other actors (such as traffic participants) explicitly and implicitly. These actors can comprise vehicles, bicycles, pedestrians, animals and the like.

The implementation of implicit communication can be particularly important in mobile robots since humans often communicate their intentions to each other implicitly (as described, for instance in Ju, 2015). Mimicking this behavior or conveying such communication in another way can increase the acceptance and integration of the mobile robot in human environments. This can reduce the effect of interactions between the mobile robot and other actors on the timely execution of the robot's task. Further, it may prevent potential harm to the mobile robot.

Such implicit interaction patterns between the two or more actors can require background or foreground attentional demand and take place based on proactive or reactive initiative (Ju, 2015). It can occur via one or more different modalities, such as kinesthetic (position, force, motion), vestibular (acceleration), tactile (pressure, touch and vibration), auditory (sound or speech), or visual (light and screens; Eibl & Zimmermann, 2014).

Some methods of robot-human interaction are known in the art. For example, U.S. Pat. No. 9,744,672 B2 discloses communicating robot intentions to human beings. This involves determining movements that a robot will make to complete a task, visually communicating a long-term intention of the robot that provides an indication of the movements the robot will make in completing the task, and visually communicating a short-term intention of the robot that provides an indication of a movement which the robot will make within the next few seconds in working towards completing the task.

Delivery robots with certain expressions are known in the art. For example, international patent application WO 2018/005911 A1 provides systems, apparatuses, and methods for an unmanned delivery vehicle system. A delivery vehicle system comprises a locomotion system of an unmanned ground vehicle configured to transport items to customer locations for deliveries, a context sensor configured to collect data of a surrounding of the unmanned ground vehicle, an indicator system on an exterior of the unmanned ground vehicle, and a control circuit. The control circuit is configured to retrieve a task profile for a delivery trip, determine a context based on data from the context sensor during the delivery trip, select an expression based on the task profile and the context, and cause the indicator system to convey the expression.

Further, partially autonomous robots have been used to deliver items to recipients for food deliveries, described in McDonald, C. (26 Feb. 2018). *Forget the Robot Apocalypse. Order Lunch*. California Magazine. These robots navigate on the pedestrian pathways and encounter humans and other actors during completion of their task. The robots discussed in the article rely on their cute and friendly appearance to gain acceptance in public areas and reduce harmful encounters with other actors.

For robots navigating on pedestrian pathways it is even more important to blend into human surroundings and navigate carefully and courteously through pedestrian and other types of traffic to minimize any negative effects on the delivery time.

SUMMARY

It is an object of the present invention to overcome or at least alleviate the shortcomings and disadvantages of the prior art. In particular, it is an object of the present invention to provide a mobile robot, method and system for interaction with other actors. actor It is also the object of the present invention to reduce robot downtime, facilitate traffic, and prevent potential harm and/or inconvenience to the mobile robot and/or actors. It is also an object of the present invention to provide improved methods of robot-human interaction in outdoor environments. It is further an object of the invention to disclose an improved mobile delivery robot configured to operate efficiently on pedestrian pathways and configured to interact with other actors.

These objects are met by the present invention.

In a first embodiment, the invention relates to a method for interactions during encounters between a mobile robot and an actor. The method comprises the mobile robot travelling on a pedestrian pathway. The method also comprises the detection of an actor. The detection is performed by the mobile robot via a sensor system. The method also comprises identifying a situation associated with the detected actor. The method further comprises determining an action to execute by the mobile robot in response to the identified situation. The method also comprises executing the determined action by the mobile robot. The action can comprise one or more actions performed by the robot. They may comprise the same action performed multiple times (e.g. the robot repeating a certain word or phrase multiple times) and/or a combination of actions performed at the same time (e.g. the robot emitting a sound, light, and performing a certain motion simultaneously).

That is, the method can provide an intuitive (for actors), efficient and safe way for the robot to navigate encounters with other actors while performing any outdoor task.

Thus, the method allows to determine the required (or preferred) action based on various inputs relevant for the situation of encounter with the actor. This may allow reducing any delay of the primary task of the robot and enabling timely and efficient execution thereof.

As used herein, the term "actor" may refer to a variety of persons or entities that the mobile robot may encounter. When travelling outdoors, the mobile robot can generally encounter traffic participants that may comprise adults, children, animals, cyclists, vehicles, wheelchair users, scooter users, other robots or the like. Furthermore, a lot of the robot's interaction may be with a user of the mobile robot services. In other words, the person requesting the mobile robot to transport an item (such as a meal) to a certain location may then need to interact with the mobile robot once they both meet at the determined location.

As used herein, the wording "robot travelling on a pedestrian pathway" is to be interpreted as the robot being engaged in a task that involves travelling from point A to point B. The robot need not be in active motion when an actor is detected. On the contrary, the robot may be stationary on a sidewalk or about to cross a traffic road when an actor is detected. In other words, the word "travelling" in the present embodiment is not to be interpreted as the robot moving specifically when an actor is detected, but rather a general action of the robot travelling over a period of time from one location to another. Pedestrian pathway may refer to any road, path, or walkway that may be frequented by pedestrians. This can comprise a sidewalk, a gravel road, a path across a field or the like.

The present method advantageously allows mobile robots to determine optimal responses to situations or encounters that may occur during the robots' operations. The type of situation encountered may depend on various parameters including a type of actor. Detecting an actor may be performed by analyzing data acquired by the mobile robot's sensors. Such sensors can comprise cameras, stereo cameras, ultrasonic sensors, time of flight sensors, lidar sensors, radar sensors or the like. The sensor data may be processed directly on the robot and/or on a remote server. The processing may comprise using a neural network-based algorithm to identify actors.

Identifying a situation may also comprise analyzing sensor data acquired by the mobile robot's sensors. For example, movement patterns of an actor (such as a pedestrian, a cyclist, a vehicle, another robot) may be analyzed to determine whether they may be on a collision course with the mobile robot. Expressions of an actor (such as facial expressions and/or gestures) may also be analyzed. Based on all of the sensor inputs and preferably based also on further input parameters (such as weather, time of day, area of travel of the mobile robot and the like), the mobile robot (and/or a remote server) may compute a type of situation that is most likely encountered by the mobile robot. This may be output in a probabilistic manner and with an associated estimated error score. The identification of a situation may be performed once, and/or a plurality of times. For example, if the situation may not be identified with a certain high probability, more input data (such as more sensor data) may be used to further identify it. Additionally or alternatively, while an interaction with an actor is ongoing, the mobile robot may periodically verify whether the identified situation is still accurate.

Once a certain situation is identified, the action to be executed by the mobile robot may be determined. Such an action may be selected from a subset of appropriate robot actions to perform in response to a given situation. Advantageously, the interaction may then be tailored to the specific scenario that was identified. The action performed by the robot may comprise one or more distinct actions. The actions can also be performed via one or more channels and/or modalities. For example, one modality can comprise an acoustic channel. In this case, the robot may emit an auditory signal such as speech and/or a specific sound. The channel then can comprise a microphone of a mobile robot. The action may also comprise a sequence of actions performed over time. The purpose of the action may be to form implicit or explicit interaction, particularly with the detected actor.

The detection of an actor may comprise determining a type of actor. The type can comprise at least one of a traffic participant and a user of mobile robot services. The traffic participant can be, for example, an adult pedestrian, a child, a cyclist, a dog, a wheelchair user, a scooter user, a roller blades user, a driver of a vehicle etc. The user of mobile robot services can generally comprise an adult that has requested the mobile robot to arrive at a certain location (for example, a person that ordered meal or package delivery via the mobile robot).

Further, detecting an actor may comprise determining a number of actors, such as a single person and/or a group of persons. The action to take in response may also depend on the number of the detected actors and their individual or mutual characteristics.

In some embodiments, identifying a situation can comprise determining at least one of an intent of the actor, an emotional state of the actor, a directed attention of the actor, and an action performed by the actor. For example, the intent of the actor may be used to differentiate, for example, between a pedestrian that wishes to pass without being obstructed and a person that shows aggression towards the robot. Determining intent and/or emotional state can be performed, for example, by analyzing the actor's facial expressions, movement, gestures, speech, or the like. Particularly, the emotional state may be determined at least in part based on a scale such as Plutchik's wheel of emotions. The emotional states of the actors may be determined based on analyzing the mobile robot's sensor data and matching the detected data to one or more of the predetermined emotion categories.

Detecting directed attention may, for example, comprise tracking the actor's eyes over a period of time to determine that they are observing the mobile robot. Additionally or alternatively, verbal cues or gestures may be analyzes (collected based on the robot's sensor data).

The action performed by the actor may comprise a movement, speech or the like.

In some such embodiments, determining at least one of the intent, the emotional state and the directed attention of the actor can comprise analyzing at least one action comprising at least one of verbal and motor behavior of the actor. In the present context, the action refers to an action taken by the actor, rather than any robot action taken in response to analyzing a situation. Note that the action may be detected independently of the intent, emotional state or the directed attention of the actor. It can then be used to determine one of those three for example.

In some such embodiments, the method can further comprise computing at least one of situation certainty and a risk level to the mobile robot based on at least one of the actor's action. This can be done, for example, based on a classification of the actor's intent or emotional state as "hostile" or "angry" respectively. In another example, detection of directed attention may also be evaluated with regard to potential risk level (that may depend on other factors such as time of day or the like).

The situation certainty may refer to how sure the robot is that a situation has been correctly identified. In other words, it can be related or comprise the error associated with the identification of the situation. In cases of high situation certainty, the robot may be almost certain that a correct identification of the situation occurred. In cases of low situation certainty, the robot may be very uncertain about the identified situation being correct.

In some embodiments, the method can further comprise, following detecting an actor, communicating with the actor to indicate the successful detection. Advantageously, letting the actor know that the mobile robot has detected them can put the actor at ease or otherwise make the interaction with the mobile robot more predictable for them. Furthermore, many situations and/or interactions may be resolved simply by communicating to the actor that the mobile robot has detected them. This kind of acknowledgement may mimic human behavior to ensure a smooth and pleasant interaction. Communicating with the actor can comprise at least one of verbal communication, visual communication, and motion-based communication. For example, the mobile robot may use lights similar to human eyes to acknowledge an actor. Additionally or alternatively, the mobile robot may emit a tone associated with a greeting and/or speech.

Communication with the actor can be both explicit and implicit. Explicit communication can comprise verbal communication and implicit communication can comprise at least one of visual communication and motion-based communication. In other words, explicit communication may comprise the robot emitting speech to greet a passerby. Implicit communication may comprise the robot performing a signature behavior such as sideways wheel motion resulting in a robot "wiggling".

In some embodiments, the method can further comprise the step of communicating intent to execute the determined action to the actor by the mobile robot before the mobile robot executes the determined action. That is, the robot may "warn" the actor that it is about to perform a certain action. For example, in the case of detecting that the robot's trajectory intersects with a pedestrian, the mobile robot may emit a cheerful sound or a light signal designed to communicate to the pedestrian that the robot will yield. Then, the robot may adjust its trajectory. In this way, the pedestrian is informed that the adjustment was not arbitrary, but a consequence of a potential path intersection. This may lead to an overall "positive" interaction with the pedestrian. In a similar example, the robot may determine that it is necessary to change its trajectory to avoid interference with the trajectory of the actor. Then, the robot may first indicate the direction in which it will change the trajectory and then, subsequently, adjust the trajectory, or the robot may start adjusting the trajectory directly, for example, to avoid an imminent collision, and indicate the intent to adjust the trajectory during the process. Further it may do both.

In some such embodiments, communicating intent can comprise emitting an auditory signal. The auditory signal can comprise speech. This can be the most direct and unambiguous way of letting actors know the robot's intentions, particularly when the actors are persons.

In other embodiments, communicating intent can comprise emitting a visual signal. The visual signal can be emitted by the mobile robot and comprise at least one of a symbol displayed on the mobile robot, a symbol projected by the mobile robot on the sidewalk, a static illumination, and an animated illumination. A visual signal can, for example, be more acceptable to actors coming from the mobile robot than human speech.

In other embodiments, communicating intent can comprise performing a predetermined motion or movement. The predetermined motion can comprise at least one or a plurality of adjusting velocity of the mobile robot, and actuating a predetermined part of the mobile robot. For example, some or all wheels of the mobile robot may be actuated sideways to perform a "wiggle". Additionally or alternatively, a part of the mobile robot such as a flag or antenna may be actuated to move in a certain way. The predetermined motion may also comprise a change in acceleration of the mobile robot (thereby leading to a change of velocity). Another motion may comprise activating one or more of the robot's motors to emit vibration and/or a certain vibration pattern.

The robot may also communicate intent by any combination or sequence of the above exemplary modalities. That is, the robot can emit an auditory signal and a visual signal, along with performing a predetermined motion. The choice of which modality to use may depend on the identified situation. For example, in more hostile or threatening situations, the robot may emit a loud signal to signify distress, as well as emitting flashing red lights. Conversely, faced with a curious passerby, the robot may emit a cheerful tone along with green lights. The set of possible situations faced by the mobile robot may comprise also associated intent communication techniques which may depend on the situation.

Communicating the intent of the mobile robot to the actor may also be classified based on whether the action to be taken by the robot is a foreground or background one, as well as whether it is a reactive or proactive one. That is, a more reactive foreground action may comprise sounding an alarm, whereas a more proactive background action may comprise projecting light to indicate the robot's upcoming trajectory. In other words, proactive action may comprise actions that are performed by the robot in anticipation of a certain action or behavior by the encountered actor. Reactive actions, on the other hand, may comprise actions performed by the robot in response to actions or behaviors of the encountered actors. This is further discussed in relation to FIG. 10. The communication of intent may also comprise the action that the robot takes in response to a certain situation. For example, the robot may always project a visual illustration of its upcoming trajectory when travelling on a sidewalk to communicate to any passerby that may or may not be there how it is likely to be moving.

In some embodiments, determining an action to execute can comprise determining a duration of an initial interaction with the actor. That is, prolonged interactions can also serve as one parameter for selecting an appropriate action for the mobile robot to take. For example, if an actor stops the robot and does not let it continue on its way for a certain amount of time, the robot may take the action of requesting the actor to let it pass.

In some embodiments, determining an action to execute can comprise determining a characteristic of the initial interaction with the actor. The characteristic may comprise a qualifier of the interaction such as "positive", "neutral", "negative" and/or be reflective of the actor's emotional state such as "scared", "curious" or the like.

In some embodiments, determining an action to execute may comprise identifying any action taken by the actor. This can be part of situation identification and/or can occur later. Such an action may comprise, for example, altering the actor's trajectory, stepping aside, moving towards or away from the robot, violence towards the robot and the like. Furthermore, the actor may be continuously analyzed to determine any new actions and/or forecast upcoming actions. The action taken by the actor may comprise, for example, movement so as to stop the progress of the mobile robot. Advantageously, this may allow the mobile robot to act in reaction to specific actions taken by the actor, leading to a more predictable and simple interaction for the actor.

In some embodiments, determining an action to execute can comprise determining environmental conditions. Environmental conditions can include, but are not limited to, available space, possible obstructions, weather conditions, traffic conditions, state and/or type of the pedestrian pathway. This can be useful to ensure that the mobile robot reacts to a situation appropriately. For example, the mobile robot may determine that a public transportation vehicle (such as a bus) is arriving to a station in the vicinity of the robot, and one or more pedestrians are running to catch it. In this case, the robot may stop motion and/or move to the side of the sidewalk or even off it to ensure that the pedestrians are unobstructed on their trajectory to the public transportation vehicle.

In some embodiments, the method can further comprise, following the execution of the determined action, determining status of the situation associated with the actor as ongoing situation or resolved situation. That is, the mobile robot may use its sensors to verify whether the situation is ongoing or not. In some such embodiments, the mobile robot can use the sensor system to determine whether a further action is needed to resolve the encounter with the actor.

In case of an ongoing situation, a new action to execute can be determined, and the new action can be executed by the mobile robot. That is, if the first determined action was unsuccessful in handling the situation of the actor, the process of determining and executing is repeated. This can advantageously allow the mobile robot to handle more complex interactions where feedback may be used to determine the next action to take. In other words, in case of an ongoing situation, the robot may not only use ongoing sensor readings to identify and/or analyze the situation, but also use the past sensor data and/or past identified situation to obtain a more precise picture of the ongoing situation. For example, the mobile robot detecting contact from an actor may be identified as a different situation depending on whether, prior to the contact, the actor said "what a cute robot!" or "I hate all robots".

In some embodiments, if the status of the encounter is determined as ongoing, an operator terminal can be notified. The operator terminal can comprise a remote terminal that can be operated by a person. The operator terminal may be able to access the mobile robot's sensor data and analysis of the situation (along with any actions that have already been taken). The operator terminal can serve as a "backup" in case the mobile robot may need assistance with some situations and/or actor interactions. The operator terminal may also be used as an additional source of sensor data or of evaluating sensor data. In other words, the operator terminal may not necessarily determine the action to take by the mobile robot, but may indicate to the mobile robot what type of situation is occurring or input further data to help identify the situation. For example, the operator terminal may be used to interpret speech of actors around the mobile robot. However, this can also be done automatically by the mobile robot's sensors.

In some embodiments, in case of an ongoing encounter status detection, the robot can be set to standby mode. That is, the robot can pause (or abort) execution of a primary task until further notice.

One exemplary advantageous embodiment of the present method can be described as follows. A mobile robot may be assigned a primary task of delivering an item to a recipient at a certain delivery location. Once the item is loaded into the mobile robot, it may start travel to the delivery location from its present location.

At some point during this travel, the mobile robot may encounter a pedestrian. The mobile robot may then detect the pedestrian by identifying it in its camera images. The pedestrian may be curious about the mobile robot, and wish to interact with it. The pedestrian may approach the mobile robot and attempt to tilt it. The robot then may detect the tilting via a flip or tilt detector based e.g. on one or more gyroscope sensors. Upon a certain predetermined tilting angle (such as 5, 10 or 15 degrees from the robot's normal upright position), the mobile robot may emit a sound conveying concern or alarm (this may also comprise speech, such as the robot emitting "no!" or "ouch!"). This can then comprise a reactive action of the mobile robot to the identified situation of the pedestrian (actor) tilting the mobile robot.

If the pedestrian continues to tilt the mobile robot to the point of flipping it sideways, the mobile robot may detect that the situation has not been resolved, but has rather changed (the situation then can be identified as the robot flipped on its side). At this point, the action taken by the mobile robot may be escalated to emitting an alarm sound, wiggling the wheels and flashing some lights (i.e. a combination of possible communication behaviors by the mobile robot). This combination of behavior may be interpreted as "turtle like" behavior upon being flipped over.

If the pedestrian then flips the mobile robot back over, the mobile robot may detect this change in situation, and emit "thank you!" as a response. In this way, the analysis of the situation may also depend on past sensor data, and not only the present sensor data. In other words, the robot has a certain "situational memory" that can be used to interpret continuing or ongoing situations.

If the pedestrian departs without turning the mobile robot over, the robot may also detect this and identify it as a new situation: being flipped over and unable to resume the primary task. In this case, the mobile robot may adjust the "turtle" behavior by turning off the siren and emit different noises to attempt to prompt any passersby to flip it back upright. This behavior may then be started upon detecting an approaching passerby (i.e. a new actor). In other words, upon detecting another approaching pedestrian, the robot may start to emit a "help me" noise, rotate the wheels and flash the lights to convey to the pedestrian that it requires help. If the pedestrian helps and turns the robot upright, the mobile robot may then detect this change in situation, and emit a "thank you" or a corresponding cheerful noise communicating gratitude and happiness.

Once the mobile robot is upright again, and there is no further actions from any surroundings pedestrians or other actors, the robot may resume its primary task and travel.

In a second embodiment, a method for delivering items to recipients is disclosed. The method comprises receiving a request for at least one item from a recipient. The method further comprises transporting the item to a delivery location via a mobile robot. The method also comprises communicating to the recipient instructions for retrieving the item.

The method further comprises the mobile robot performing at least one action to facilitate the retrieval of the item by the recipient.

This second embodiment can advantageously allow to facilitate a subset of interactions or situations described with respect to the first embodiment above. That is, interactions with users of mobile robot services can be streamlined and made more convenient for the users. The recipient of the item stored in the mobile robot may be assisted or guided throughout the interaction with the robot. This can be particularly useful to ensure that the recipient experiences a smooth and positive interaction with the mobile robot.

In some such embodiments, the action to facilitate the retrieval of the item by the recipient can comprise emitting an audio signal. The audio signal can comprise speech instructing the delivery recipient on further interaction with the mobile robot. The audio signal can also be adapted based on the recipient's actions. The mobile robot can use a sensor system to detect the recipient's actions and a processing component to evaluate them and adapt the audio signal accordingly.

That is, audio signals comprising pure sounds can play sounds associated with correct actions or signature behavior if the recipient is performing actions that will lead to correct item retrieval (for example, approaching the robot, facing it on the correct side, opening the lid, retrieving the item, subsequently closing the lid, or other such actions). In the case of speech, the instructions can include detailed instructions for actions to take, and, based on whether the recipient correctly performs them or not, instructions for further actions or a repetition of the instructions for actions performed incorrectly.

In some other embodiments, the action to facilitate the retrieval of the item by the recipient can comprise emitting a visual signal. The visual signal can comprise at least one of a symbol displayed on the mobile robot, a symbol projected by the mobile robot on the sidewalk, a static illumination, and an animated illumination. Preferably, the visual signal can also be adapted or adjusted based on the recipient's actions.

In some other embodiments, the action to facilitate the retrieval of the item by the recipient can comprise performing a predetermined movement. The predetermined movement can comprise at least one of actuating a predetermined part of the mobile robot, performing a back and forth motion, and rotating the mobile robot. Advantageously, movement-based actions can intuitively communicate to the recipient how the interaction with the mobile robot should proceed. For example, if the recipient should open the robot from the back, the robot may rotate and then "nudge" closer to the recipient to indicate that this is what is expected.

In some embodiments, the method can further comprise the mobile robot using a sensor system to detect the recipient's actions following the mobile robot's action to facilitate the retrieval of the item by the recipient. In such embodiments, the method can further comprise using a processing component to analyze the recipient's actions and determine whether a further robot action is to be performed. The mobile robot can then perform a further action upon detecting that the recipient has not successfully retrieved the item. The mobile robot can also notify an operator terminal upon detecting that the recipient has not successfully retrieved the item. This can ensure that the item recipient successfully retrieves the item from the mobile robot by gradually escalating the offered interaction assistance.

In a third embodiment, a mobile robot configured for execution of delivery tasks in an outdoor environment is disclosed. The mobile robot comprises a navigation component configured for at least partially autonomous navigation in outdoor environment. The mobile robot also comprises a sensor system configured for collecting sensor data during an encounter between the mobile robot and an actor. The mobile robot further comprises a processing component configured to process the sensor data and output actions for the mobile robot to perform. The mobile robot also comprises an output component configured for executing actions determined by the processing component.

The mobile robot can advantageously be configured for travel on pedestrian walkways such as sidewalks or paths. The robot can advantageously be configured to interact with actors (such as pedestrians, drivers, cyclists or the like) in a coherent way that is intuitive and understandable for the actors. Particularly, the mobile robot can be configured to execute the method for interactions as described in the above embodiments.

In some embodiments, the robot can be configured to communicate with actors comprising at least one of traffic participants and recipients in order to execute item deliveries. The communication can comprise different modalities (such as e.g. verbal or kinetic). The actors can broadly be categorized into two categories: traffic participants and recipients. Traffic participants may comprise any persons or entities (including other robots) encountered by the mobile robot while travelling or idling. Recipients may specifically comprise users of the mobile robot services. In other words, recipients can comprise persons that have ordered/requested an item (such as a package, a meal, groceries or the like) to be delivered via a mobile robot. Advantageously, communicating with actors allows the mobile robot to blend more seamlessly into its surroundings and execute its tasks (such as item delivery) more efficiently.

In some embodiments, the sensor system of the mobile robot can comprise at least one of at least one visual camera, at least one stereo camera, at least one motion detector at least one radar. at least one time of flight sensor, at least one accelerometer, and at least one gyroscope. The robot may further comprise one or more ultrasonic sensors and lidar sensors. Preferably, the robot comprises a plurality of sensors configured to work in tandem so as to obtain various sensor data that can be used to interpret situations and actor encounters.

In some preferred embodiments, the sensor system can comprise at least two visual cameras. More preferably, four or more, such as six or more, such as eight or more cameras can be used. At least some of the cameras can be preferably stereo cameras, such as two cameras, preferably four cameras, more preferably six cameras.

In some embodiments, the sensor system can be configured to adjust sensor parameters during the encounter between the mobile robot and the actor. That is, depending on the situation and on the ongoing encounter, the sensors can be prompted to detect data with varied parameters. This can be advantageous in case greater resolution or better quality data is needed during an interaction with an actor (as compared to during normal mobile robot operations). In some such embodiments, at least one of frame rate, resolution and field of view parameters of the sensors can be adjusted during the encounter.

In some embodiments, the processing component can be configured to detect and recognize actions taken by the actor based on the sensor data. That is, the processing component of the mobile robot can analyze the sensor data to determine likely actor behavior. This can be done, for example, via a neural network-based algorithm.

In some embodiments, the robot can further comprise an item space configured to hold items transported by the mobile robot in outdoor environments to recipients at delivery locations. The item space may be encompassed by the mobile robot's body. It may also be lockable via an electronic lock that a recipient can open. In some such embodiments, the processing component can be configured to detect whether the recipient has successfully removed the item from the item space based on sensor data. For instance, the item space might comprise a weight sensor, a camera, a time of flight sensor or the like that allows to determine the presence or absence of the item in it. Advantageously, if the processing component detects that the recipient did not remove the item, further interaction with the recipient can be initiated by the mobile robot to ensure that they receive their item.

In some embodiments, the processing component can be configured to analyze trajectory of the actors travelling in the vicinity of the mobile robot. In some such embodiments, the processing component can be configured to adapt the mobile robot's trajectory when detecting an intersection with the actor's trajectory. That is, the mobile robot can travel in a way that does not inconvenience any pedestrians or causes them to adjust their path.

In some embodiments, the processing component can be configured to analyze whether the mobile robot requires assistance from the actor and output corresponding actions for the mobile robot to perform to receive assistance. In some such embodiments, the assistance can comprise at least one of physically moving the mobile robot, removing an obstacle around the mobile robot, and opening a barrier for a mobile robot. In other words, the robot may request assistance via a sound (such as a speech), behavior, visual signal or the like.

In some embodiments, the output component can comprise a sound emitting device.

In some other embodiments, the output component can comprise a visual signal emitting device.

In some other embodiments, the output component can comprise an actuation device. The actuation device can be configured to selectively actuate a predetermined part of the mobile robot. For example, the actuation device can be configured to actuate a signaling device such as a flag that increases the visibility of the mobile robot. Advantageously, this can communicate the mobile robot's intent or indicate the action that it is about to take.

The output component may also comprise a plurality of devices, such as any combination of a sound emitting device, visual signal emitting device and an actuation device.

In some embodiments, the output component can be configured to communicate intent of the mobile robot to the actor. This can be particularly useful for ensuring positive and streamlined interactions between the mobile robot and any actors.

The output component can also be configured to communicate to the recipient steps to be taken to retrieve the item from the item space. This can comprise a particular specific subset of possible robot-actor interactions that is important for mobile robot delivery operations.

The output component can also be configured to request the actor to assist the mobile robot. For example, the robot may emit speech requesting help with getting unstuck from a tight spot.

In a fourth embodiment, a system for execution of delivery tasks in a dynamic environment is disclosed. The system comprises a mobile robot according to any of the preceding robot embodiments. The system also comprises a central server. The system further comprises an operator terminal. The central server is configured to communicate with the mobile robot and the operator terminal. The mobile robot is configured to request assistance when an interaction between the mobile robot and at least one of actor and recipient cannot be concluded by the mobile robot. The central server is configured to evaluate the assistance request and if deemed necessary forward it to an operator terminal for further evaluation.

The present system can be particularly configured to execute the method according to any of the preceding method embodiments.

The processing and computational steps of the method as described above can be executed either entirely by the mobile robot or shared between the mobile robot and the central server. For example, the mobile robot may send requests for evaluation of a particular situation based on its sensor data to the central server.

In a fifth embodiment, use of the mobile robot according to any of the preceding embodiments (particularly mobile robot embodiments) is disclosed. The use comprises autonomous item delivery.

The present invention also relates to the following numbered embodiments.

Below, method embodiments will be discussed. Those embodiments are abbreviated with the letter "M" followed by a number. Whenever reference is herein made to method embodiments, these embodiments are meant.

M1. A method for interactions during encounters between a mobile robot and an actor, the method comprising the steps of
   the mobile robot travelling on a pedestrian pathway;
   detecting an actor by the mobile robot via a sensor system;
   identifying a situation associated with the detected actor
      in response to the identified situation, determining an action to execute by the mobile robot; and
   executing the determined action by the mobile robot.

M2. The method according to the preceding embodiment, wherein detecting an actor comprises determining a type of actor, the type comprising at least one of
   a traffic participant; and
   a user of mobile robot services.

M3. The method according to any of the preceding embodiments, wherein detecting an actor comprises detecting a number of actors.

M4. The method according to any of the preceding embodiments, wherein identifying a situation comprises determining at least one of an intent of the actor;
   an emotional state of the actor;
   a directed attention of the actor; and
   an action performed by the actor.

M5. The method according to the preceding embodiment wherein determining at least one of the intent, the emotional state and the directed attention of the actor comprises analyzing at least one action comprising at least one of verbal and motor behavior of the actor.

M6. The method according to the preceding embodiment wherein the method further comprises computing at least one of situation certainty and a risk level to the mobile robot based on at least one of the actor's action.

M7. The method according to any of the preceding embodiments, further comprising, following detecting an actor communicating with the actor to indicate the successful detection.

M8. The method according to the preceding embodiment wherein communicating with the actor comprises at least one of
- auditory communication;
- visual communication; and
- motion-based communication.

M9. The method according to embodiment M7, wherein communication with the actor is both explicit and implicit.

M10. The method according to the preceding embodiment wherein explicit communication comprises verbal communication and implicit communication comprises at least one of visual communication and motion-based communication.

M11. The method according to any of the preceding embodiments further comprising the step of communicating intent to execute the determined action to the actor by the mobile robot before the mobile robot executes the determined action.

M12. The method according to the preceding embodiment wherein communicating intent comprises emitting an auditory signal.

M13. The method according to the preceding embodiment wherein the auditory signal comprises speech.

M14. The method according to any of the preceding embodiments and with the features of embodiment M11 wherein communicating intent comprises emitting a visual signal.

M15. The method according to the preceding embodiment wherein the visual signal is emitted by the mobile robot and comprises at least one of
- a symbol displayed on the mobile robot; and
- a symbol projected by the mobile robot on the sidewalk; and
- a static illumination; and
- an animated illumination.

M16. The method according to any of the preceding embodiments and with the features of embodiment M11 wherein communicating intent comprises performing a predetermined motion.

M17. The method according to the preceding embodiment wherein the predetermined motion comprises at least one or a plurality of
- adjusting velocity of the mobile robot; and
- actuating a predetermined part of the mobile robot.

M18. The method according to any of the preceding embodiments, wherein determining an action to execute comprises determining a duration of an initial interaction with the actor.

M19. The method according to any of the preceding embodiments, wherein determining an action to execute comprises determining a characteristic of the initial interaction with the actor.

M20. The method according to any of the preceding embodiments, wherein determining an action to execute comprises identifying any action taken by the actor.

M21. The method according to any of the preceding embodiments, wherein determining an action to execute comprises determining environmental conditions.

Environmental conditions can include, but are not limited to, available space, possible obstructions, weather conditions, traffic conditions, state and/or type of the pedestrian pathway.

M22. The method according to any of the preceding embodiments, further comprising, following the execution of the determined action, determining status of the situation associated with the actor as ongoing situation or resolved situation.

M23. The method according to the preceding embodiment, wherein the mobile robot uses the sensor system to determine whether a further action is needed to resolve the situation with the actor.

M24. The method according to any of the preceding embodiments and with the features of embodiment M22, wherein, in case of an ongoing situation,
- a new action to execute is determined; and
- the new action is executed.

That is, if the first determined action was unsuccessful in handling the situation associated with the actor, the process of determining and executing is repeated.

M25. The method according to any of the preceding embodiments and with the features of embodiment M22, wherein if the status of the situation is determined as ongoing, an operator terminal is notified.

M26. The method according to the preceding embodiment, wherein in case of an ongoing situation status, the robot is set to standby mode.

That is, the robot pauses (or aborts) the execution of the primary task until further notice.

M27. A method for delivering items to recipients, the method comprising the steps of
- receiving a request for at least one item from a recipient; and
- transporting the item to a delivery location via a mobile robot; and
- communicating to the recipient instructions for retrieving the item; and
- the mobile robot performing at least one action to facilitate the retrieval of the item by the recipient.

M28. The method according to the preceding embodiment wherein the action to facilitate the retrieval of the item by the recipient comprises emitting an audio signal.

M29. The method according to the preceding embodiment wherein the audio signal comprises speech instructing the delivery recipient on further interaction with the mobile robot.

M30. The method according to any of the two preceding embodiments further comprising adapting the audio signal based on the recipient's actions.

M31. The method according to the preceding embodiment further comprising the mobile robot using a sensor system to detect the recipient's actions and a processing component to evaluate them and adapt the audio signal accordingly.

That is, audio signals comprising pure sounds can play sounds associated with correct actions or signature behaviour if the recipient is performing actions that will lead to correct item retrieval (for example, approaching the robot, facing it on the correct side, opening the lid, retrieving the item, subsequently closing the lid, or other such actions). In the case of speech, the instructions can include detailed instructions for actions to take, and, based on whether the recipient correctly performs them or not, instructions for further actions or a repetition of the instructions for actions performed incorrectly.

M32. The method according to any of the preceding embodiments M27 to M31 wherein the action to facilitate the retrieval of the item by the recipient comprises emitting a visual signal.

M33. The method according to the preceding embodiment wherein the visual signal comprises at least one of
- a symbol displayed on the mobile robot; and
- a symbol projected by the mobile robot on the sidewalk; and
- a static illumination; and
- an animated illumination.

M34. The method according to any of the preceding embodiments wherein the action to facilitate the retrieval of the item by the recipient comprises performing a predetermined movement.

M35. The method according to the preceding embodiment wherein the predetermined movement comprises at least one of
    actuating a predetermined part of the mobile robot; and
    performing a back and forth motion; and
    rotating the mobile robot.

M36. The method according to any of the preceding embodiments further comprising the mobile robot using a sensor system to detect the recipient's actions following the mobile robot's action to facilitate the retrieval of the item by the recipient.

M37. The method according to the preceding embodiment further comprising using a processing component to analyze the recipient's actions and determine whether a further robot action is to be performed.

M38. The method according to any of the two preceding embodiments wherein the mobile robot performs a further action upon detecting that the recipient has not successfully retrieved the item.

M39. The method according to any of the three preceding embodiments further comprising the mobile robot notifying an operator terminal upon detecting that the recipient has not successfully retrieved the item.

Below, robot embodiments will be discussed. Those embodiments are abbreviated with the letter "R" followed by a number. Whenever reference is herein made to robot embodiments, these embodiments are meant.

R1. A mobile robot configured for execution of delivery tasks in an outdoor environment, comprising
    a navigation component configured for at least partially autonomous navigation in outdoor environment; and
    a sensor system configured for collecting sensor data during an encounter between the mobile robot and an actor;
    a processing component configured to process the sensor data and output actions for the mobile robot to perform; and
    an output component configured for executing actions determined by the processing component.

R2. The mobile robot according to the preceding embodiment configured to communicate with actors comprising at least one of traffic participants and recipients in order to execute item deliveries.

R3. The mobile robot according to any of the preceding robot embodiments wherein the sensor system comprises at least one of
    at least one visual camera; and
    at least one stereo camera; and
    at least one motion detector; and
    at least one radar; and
    at least one time of flight sensor; and
    at least one accelerometer; and
    at least one gyroscope.

R4. The mobile robot according to any of the preceding robot embodiments wherein the sensor system comprises at least two visual cameras.

R5. The mobile robot according to any of the preceding robot embodiments wherein the sensor system is configured to adjust sensor parameters during the encounter between the mobile robot and the actor.

R6. The mobile robot according to the preceding embodiment wherein at least one of frame rate, resolution and field of view parameters of the sensors are adjusted during the encounter.

R7. The mobile robot according to any of the preceding robot embodiments wherein the processing component is configured to detect and recognize actions taken by the actor based on the sensor data.

R8. The mobile robot according to any of the preceding robot embodiments further comprising an item space configured to hold items transported by the mobile robot in outdoor environments to recipients at delivery locations.

R9. The mobile robot according to the preceding embodiment wherein the processing component is configured to detect whether the recipient has successfully removed the item from the item space based on sensor data.

R10. The mobile robot according to any of the preceding robot embodiments wherein the processing component is configured to analyze the trajectory of the actors travelling in the vicinity of the mobile robot.

R11. The mobile robot according the preceding embodiment wherein the processing component is configured to adapt the mobile robot's trajectory when detecting an intersection with the actor's trajectory.

R12. The mobile robot according to any of the preceding robot embodiments wherein the processing component is configured to analyze whether the mobile robot requires assistance from the actor and output corresponding actions for the mobile robot to perform to receive assistance.

R13. The mobile robot according to the preceding embodiment wherein the assistance comprises at least one of
    physically moving the mobile robot; and
    removing an obstacle around the mobile robot; and
    opening a barrier for a mobile robot.

R14. The mobile robot according to any of the preceding robot embodiments wherein the output component comprises a sound emitting device.

R15. The mobile robot according to any of the preceding robot embodiments wherein the output component comprises a visual signal emitting device.

R16. The mobile robot according to any of the preceding robot embodiments wherein the output component comprises an actuation device.

R17. The mobile robot according to the preceding embodiment wherein the actuation device is configured to selectively actuate a predetermined part of the mobile robot.

For example, the actuation device can be configured to actuate a signaling device such as a flag that increases the visibility of the mobile robot.

R18. The mobile robot according to any of the preceding robot embodiments wherein the output component is configured to communicate intent of the mobile robot to the actor.

R19. The mobile robot according to any of the preceding robot embodiments and with the features of embodiment R8 wherein the output component is configured to communicate to the recipient steps to be taken to retrieve the item from the item space.

R20. The mobile robot according to any of the preceding robot embodiments wherein the output component is configured to request the actor to assist the mobile robot.

Below, system embodiments will be discussed. Those embodiments are abbreviated with the letter "S" followed by a number. Whenever reference is herein made to system embodiments, these embodiments are meant.

S1. A system for execution of delivery tasks in a dynamic environment, the system comprising a mobile robot according to any of the preceding robot embodiments; and a central server; and an operator terminal wherein the central server is configured to communicate with the mobile robot and the operator terminal; and wherein the mobile robot is configured to request assistance when an interaction between the mobile robot and an actor cannot be concluded by the mobile robot; and wherein the central server is configured to evaluate the assistance request and if deemed necessary forward it to an operator terminal for further evaluation.

S2. The system according to the preceding system embodiment configured to execute the method according to any of the preceding method embodiments.

Below, use embodiments will be discussed. These embodiments are identified by the letter "U" followed by a number. Whenever reference is herein made to a use embodiment, these embodiments are meant.

U1. A use of the mobile robot according to any of the preceding embodiments, wherein the use comprises autonomous item delivery.

Embodiments of the present invention will now be described with reference to the accompanying drawings. It should be understood that these embodiments are meant to exemplify, and not to limit, the scope of the present invention.

DESCRIPTION OF EMBODIMENTS

In the following, the method and corresponding elements and working principals thereof are explained in detail, including examples.

Figure 1A:
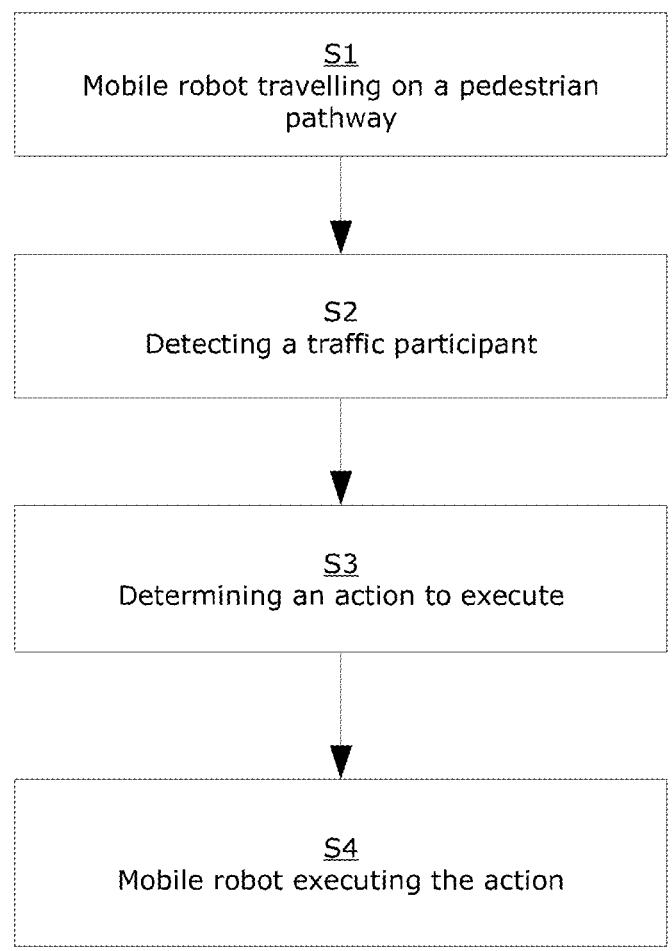
FIGS. 1a and 1b depict a schematic overview of a method for interactions during encounters between a mobile robot and actors according to one aspect of the invention.
Figure 1B:
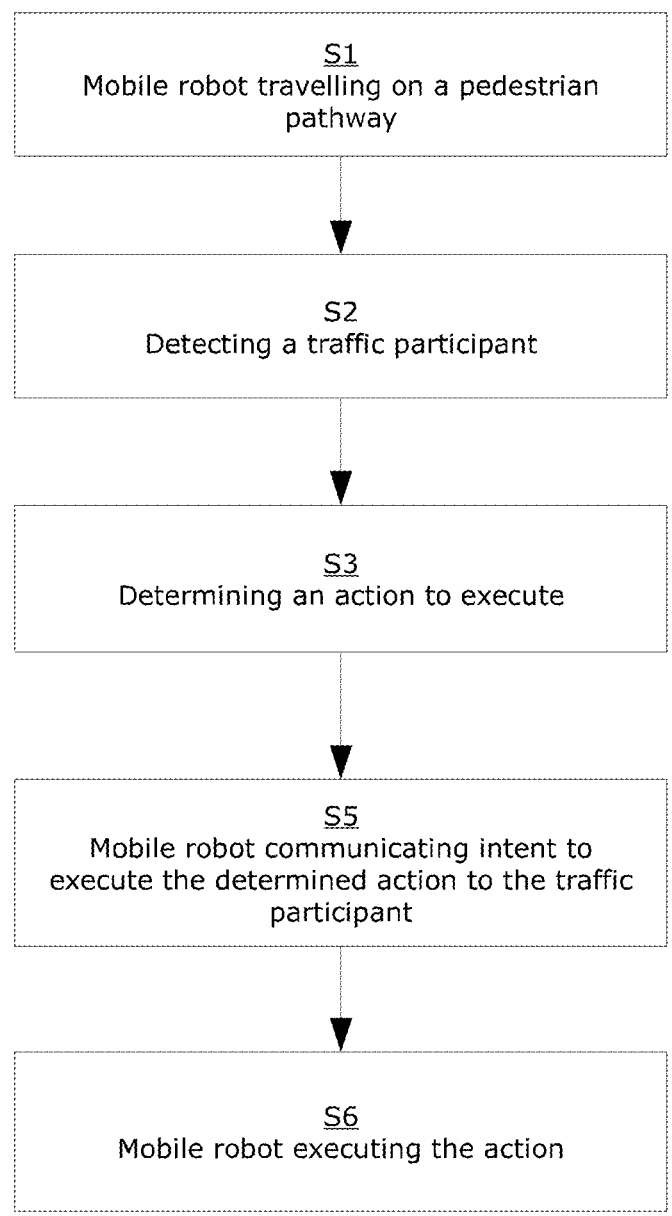

The method for efficient handling of an encounter of another actor, such as a pedestrian, by a mobile robot is schematically shown in FIGS. 1a and 1b. The mobile robot is travelling in an outdoor environment, for example, including but not limited to pedestrian pathways or cycle lanes. In the case of detecting an actor, the robot can, depending on the circumstances, determine any necessary (or preferable) action. The detection of the actor can be done via a sensor system, as further detailed below. The robot can then execute the determined action. The action can comprise adjusting the robot's trajectory, stopping, changing the robot's velocity, letting a pedestrian pass before resuming travelling, or other such actions.

Optionally, the mobile robot may communicate its intent before or during the execution of the task, as explicitly shown in FIG. 1b, S5. This can comprise emitting an audio and/or a visual signal, performing a predetermined movement or motion or a combination thereof.

Figure 2:
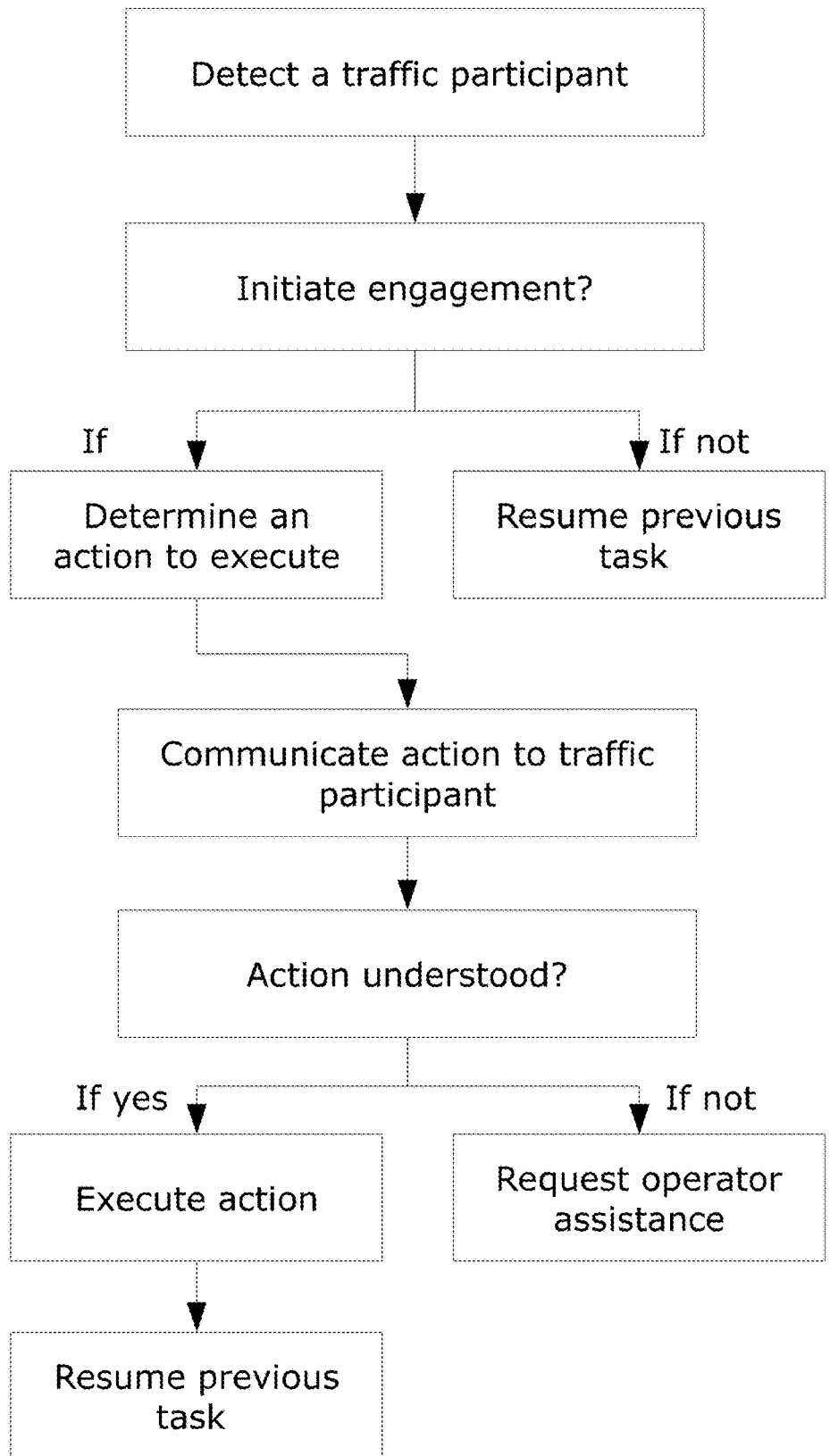
FIG. 2 depicts the mobile robot's decision-making process when encountering a actor.

FIG. 2 illustrates the decision process of the robot in greater detail. Upon detection of an actor, the robot can decide if an action is required (or preferable) to prevent any harm to the robot and/or the other actor and reduce the chance of delaying its primary task, i.e. the original purpose of travelling in an outdoor environment, for example, delivery of an item. This is indicated in the figure by the step of deciding whether to initiate engagement with the actor.

If an action is required or desirable, the robot determines the best action to execute, which may include, for example, moving out of the way, adjusting the speed, stopping to let other actor pass, continuing with the primary task, offering the actor to interact with the robot (for example, to buy something that the robot is carrying, if the robot is operated as a mobile vending machine), asking for assistance, etc.

If no action is required, the robot will continue to carry out its primary or previous task.

Further, if an action is chosen, the robot determines if communicating its intent is necessary (or preferable) for the efficient resolution of the encounter with the actor. The robot may then communicate the intent either before or during the execution of the action or execute the action without communication of the intent.

If the action has been understood, the robot can proceed to execute it and return to executing its primary task. Note, that a sensor-based measurement of whether an action has been understood or not may comprise an inherent high error, or not be accurate. In this case, the robot may still proceed with the action provided some predetermined parameters have been fulfilled (e.g. the actor performs a certain action, has a certain change in position or facial expression, or even does not react). For example, if the robot encounters a pedestrian travelling in the opposite direction on a narrow sidewalk, it can signal to the pedestrian that it spotted it via a visual blinking signal, and stop at the edge to let the pedestrian pass. A pedestrian walking past the robot indicates that the intent was understood, and that the robot can resume travelling in order to arrive to its destination.

If the action and/or the intent to perform the action has not been understood by the pedestrian, the robot can request further assistance, for instance from an operator terminal. Going back to the previous example, the pedestrian stopping and not passing the robot may indicate that the intent of the robot to let the pedestrian pass has not been understood, and that further interaction is desirable. The operator terminal can include access to the robot's sensor system and/or to the robot's audio and/or visual signal emitting devices. In this way, an operator can see the situation, evaluate it, and communicate directly with the actor in order to resolve the encounter. Since the mobile robot preferably operates autonomously, resorting to assistance from the operator terminal is preferably minimized. For example, the robot may try an additional action and/or communication of intent if it detects that the actor did not understand the first communication and/or action.

That is, determining an action to execute includes determining if an action is required (or preferable), choosing an action to carry out and deciding if communication of the intent is necessary.

Figure 3:
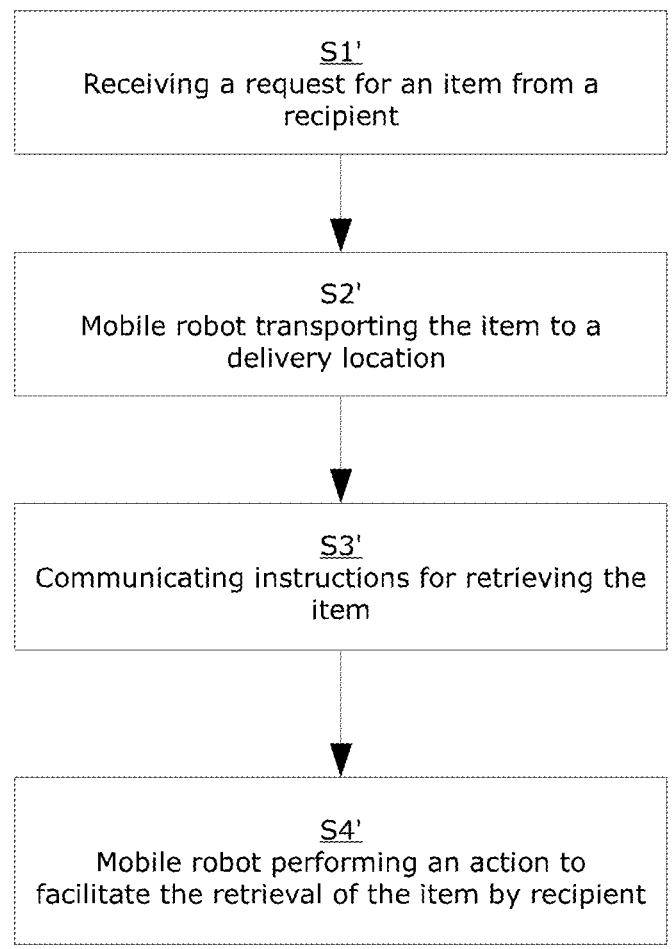
FIG. 3 depicts a schematic overview of a method for delivering items to recipients according to another aspect of the invention.

FIG. 3 depicts an alternative exemplary method for delivering items to recipients, the method including interaction between a mobile robot and a recipient. In a first step, a request for an item to be delivered is received from the recipient. This can be done directly via the recipient, for example, via the recipient's personal mobile device such as a smartphone, and/or via partner institutions and businesses (for example, if the recipient ordered an item online, and it is being delivered in several stages, the last of which involves transport via the mobile robot).

In step S2', the mobile robot transports the requested item to a delivery location. The delivery location can be an arbitrary meeting point, the recipient's residence, place of business or another chosen place, a public place or another place specifically confirmed during the requesting of the delivery.

Step S3' illustrates communicating instructions for retrieving the item from the mobile robot to the recipient. This step can be performed at any point, for example, it can be performed directly after receiving the request for the item, while the mobile robot is travelling and/or after it has arrived at the delivery location.

In step S4', the mobile robot performs an action to facilitate the retrieval of the item by the recipient. In other words, the robot interacts with the recipient in order to further facilitate the transfer of the item from the robot to the recipient. This action can comprise, for example, an auditory and/or visual signal indicating to the recipient which actions they should take (in a simple example, the action can comprise an LED arrow pointing towards the lid of the robot, indicating that the recipient should lift it). Additionally or alternatively, the robot can also perform a specific motion or movement. For example, the robot can wiggle or otherwise jerk, to indicate to the recipient that it is ready for the item transfer (and/or to indicate that it is the correct robot, in case when more than one robot is present in the vicinity).

Figure 4:
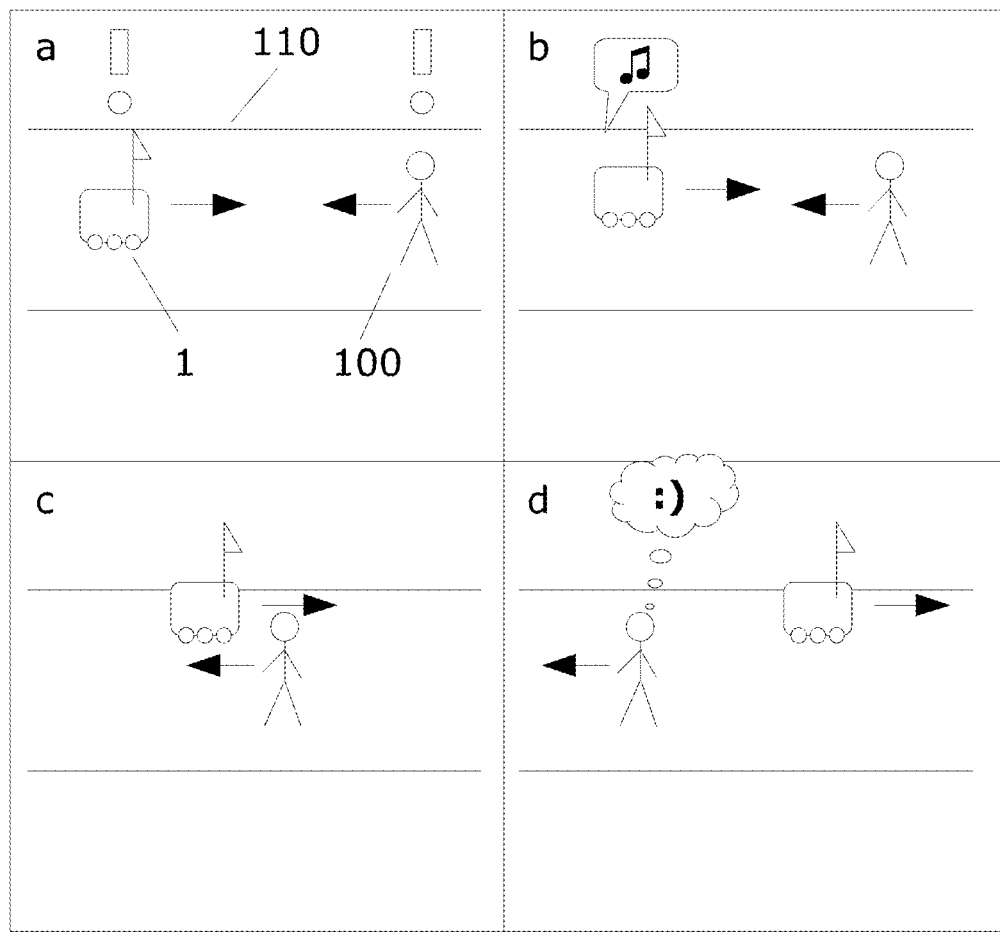
FIGS. 4 and 5 depict examples of interactions between the mobile robot and an actor and a recipient respectively.
Figure 5:
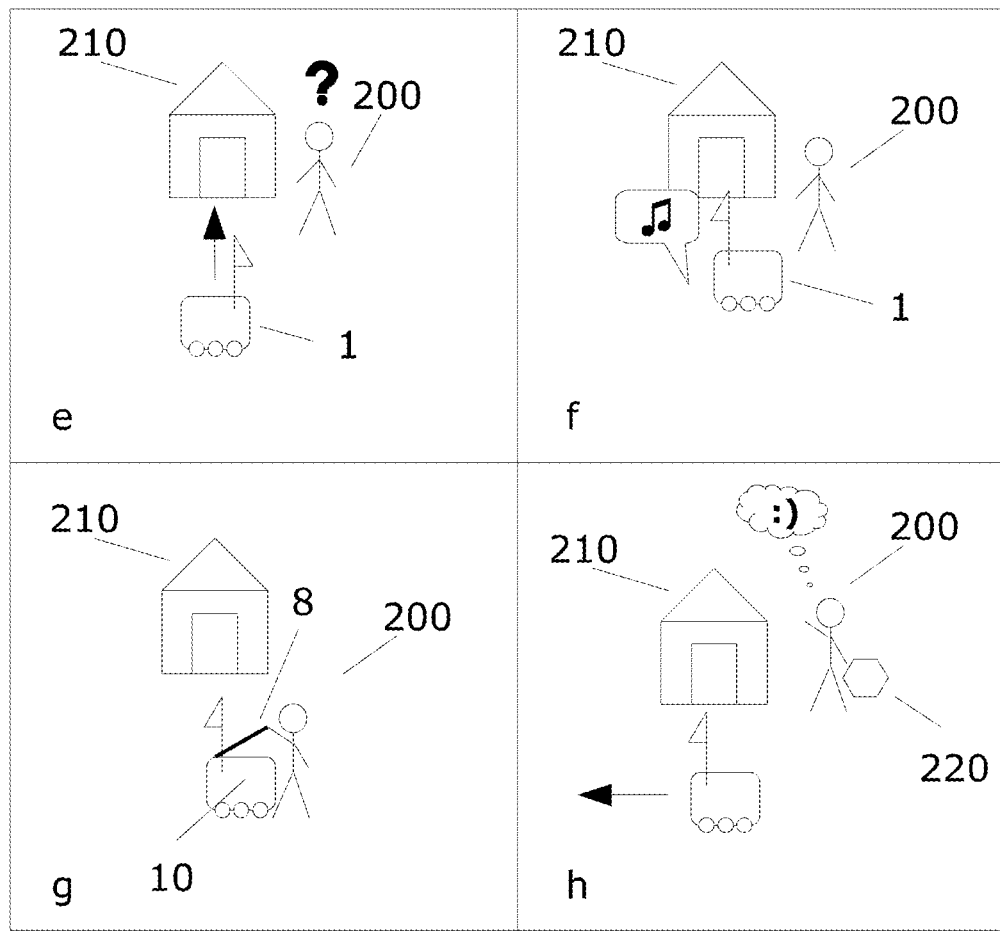

Examples of robot-human interaction (that is, the mobile robot's interaction with actors) is given in FIGS. 4 and 5.

FIG. 4 shows an exemplary embodiment of a mobile robot 1 encountering an actor 100 while travelling on a pedestrian pathway 110.

The robot 1 is travelling on the pedestrian pathway 110 during execution of its primary task, and encounters a pedestrian 100 (sketch a). In a first step, both the robot 1 and the pedestrian 100 detect each other, which may happen simultaneously or in any sequential order. The robot 1 determines that an action is required to avoid a collision and any harm to the pedestrian 100, and ensure efficient execution of its primary task. The action here being a change of trajectory to avoid the pedestrian 100.

The robot 1 starts to adjust its trajectory (sketch b) while emitting a noise or a prerecorded message directed at the pedestrian to communicate its intent to adjust the trajectory. The movement may be smooth or gradual. The communication of intent may be additionally (or exclusively) non-verbal, i.e. the robot 1 may visually indicate the intent to the pedestrian 100, for example, the robot may use the flag or body LEDs to indicate in which direction the robot intents to move.

The robot 1 may also use any form of verbal or non-verbal communication to indicate that the pedestrian 100 was detected. For example, the robot may flash its lights or emit a sound indicating a greeting when first detecting the pedestrian 100.

Sketch b further indicates that the pedestrian 100 understood the robot's communication of its intent and the action it is undertaking, this understanding indicated by the pedestrian 100 not changing their trajectory nor speed.

The successful encounter leads to the pedestrian 100 following their original trajectory (sketch c), while the robot 1 passes at a safe distance on its adjusted trajectory.

The smooth and successful resolving of the encounter (sketch d) may increase the acceptance of the robot 1 by the actor 100 and verbal and non-verbal communication of the robot 1 may positively influence the perception of the robot by the pedestrian 100.

In other words, future encounters may benefit from the smooth resolution of the encounter and allow an efficient operation of the delivery robot.

FIG. 5 depicts an exemplary embodiment of an encounter between the mobile robot 1 and a recipient 200. The robot 1 carries an item 220 that the recipient 200 ordered. Sketch e shows the mobile robot 1 arriving to the delivery location 210, depicted there as the recipient's residence. The recipient 200 is shown as puzzled about how they should proceed in their interaction with the robot 1.

Sketch f shows the mobile robot approaching the recipient 200 while conveying the steps that the recipient 200 should take to retrieve their item 220 from the mobile robot 1. This can be done via verbal instructions in the form of a recorded speech, visual instructions in the form of LEDs indicating to the recipient where they should open the lid of the robot 1 to retrieve their item 220 and/or other actions. The recipient 200 has understood the robot's instructions in the sketch.

In sketch g, the recipient 200 is performing the instructions as conveyed (or as reminded) by the robot 1. The recipient 200 opens the lid 8 of the robot 1 to access the item space 10, where the item 220 is stored.

Sketch h shows the recipient with the retrieved item 220, and the mobile robot 1 retreating to perform further tasks. The recipient 200 experienced a pleasant interaction with the robot 1 and is experiencing positive sentiments towards it.

Figure 6:
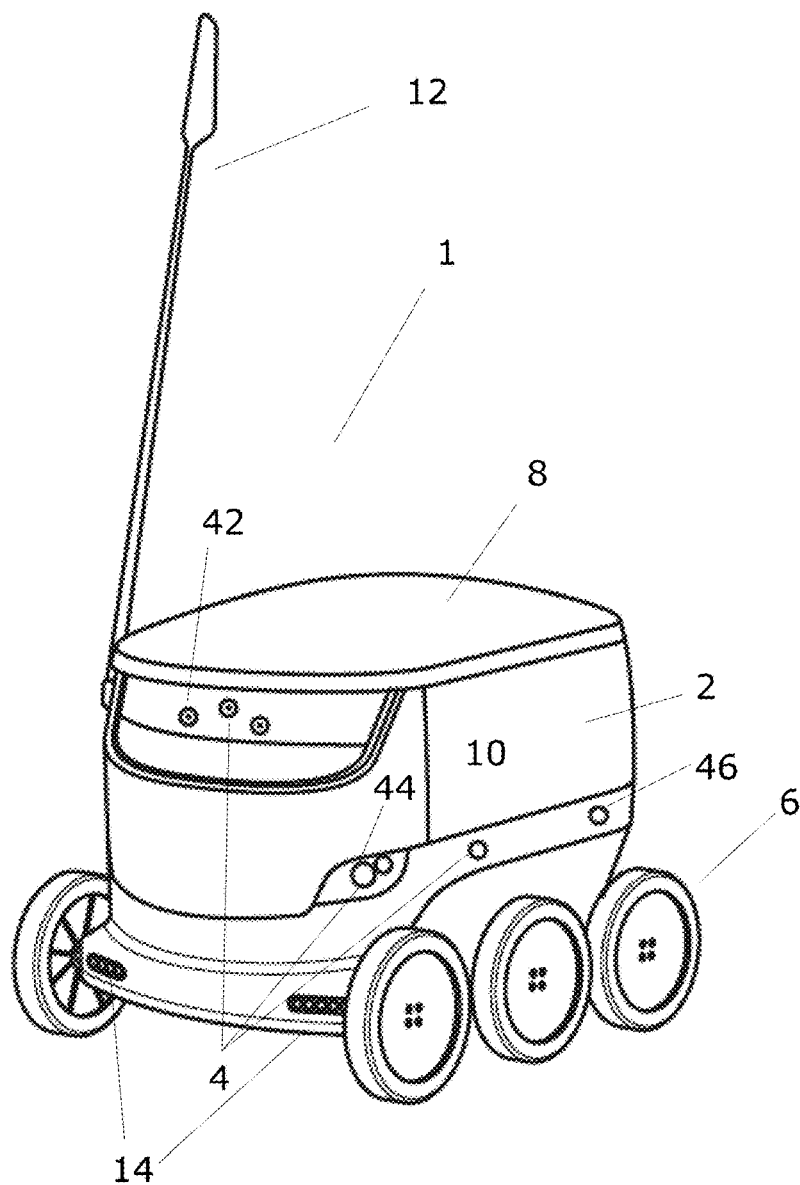
FIG. 6 depicts an embodiment of a mobile robot according to one aspect of the invention.

FIG. 6 depicts an exemplary embodiment of the mobile robot 1 according to an aspect of the present invention. The mobile robot 1 can comprise a delivery and/or a vending robot, that is, it can transport and deliver packages, consumable items, groceries or other items to customers and navigate in outdoor environments.

The mobile robot 1 comprises a robot body 2. The body 2 comprises an item space 10 in which items can be placed and transported by the robot. In the present figure, the item space 10 is inside the body 2 of the robot 1, and therefore not seen directly.

The mobile robot 100 further comprises a robot motion component 6 (depicted as wheels 6). In the present embodiment, the motion component 6 comprises six wheels 6. This can be particularly advantageous for the mobile robot 1 when traversing curbstones or other similar obstacles on the way to delivery recipients.

The mobile robot 1 further comprises a robot lid 8. The lid 8 can be placed over the item space 10 and locked to prevent unauthorized access to the items the mobile robot 1 is carrying.

The mobile robot 1 further comprises a robot signaling device 12, depicted here as a flagpole or stick 12 used to increase the visibility of the robot 1. Particularly, the visibility of the robot 1 during road crossings can be increased. In some embodiments, the signaling device 12 can comprise an antenna. The mobile robot 1 further comprises robot headlights 14 configured to facilitate the robot's navigation in reduced natural light scenarios and/or increase the robot's visibility further. The headlights are schematically depicted as two symmetric lights 14, but can comprise one light, a plurality of lights arranged differently and other similar arrangements.

The mobile robot 1 also comprises a sensor system 4. The sensor system 4 can comprise a plurality of sensors collecting different types of data about the robot's surroundings and/or functioning. The sensors can comprise visual cameras, radar sensors, ultrasonic sensors, Lidar sensors, time of flight cameras, accelerometers and/or other sensors. Particularly depicted in the figure are cameras 42, stereo cameras 44 and ultrasonic sensors 46. This is for illustrative purposes only.

The robot sensors can also allow the robot 1 to navigate and travel to its destinations at least partially autonomously. That is, the robot can be configured to map its surroundings, localize itself on such a map and navigate towards different destinations using in part the input received from the multiple sensors 42, 44, 46.

The mobile robot 1 can further comprise a processing component (not shown in the figure). The processing component can comprise one or more system on a chip devices, processors and/or microcontrollers. A plurality of processors can be used for different sensor data processing, data combination, navigation and/or further tasks performed by the mobile robot 1.

Note, that as used herein, the terms autonomous or semi-autonomous robot can be used to mean any level of automation depending on the task that the robot is performing. That is, the robot can be adapted to function autonomously or semi-autonomously for most of the tasks, but can also be remotely controlled for some other tasks. Then, the robot would be non-autonomous during the time it is controlled, and then autonomous and/or semi-autonomous again when it is no longer controlled. For example, the robot can assume any of the levels of automation as defined by the Society of Automotive Engineers (SAE), that is, the levels as given below.

Level 0—No Automation
Level 1—Driver Assistance
Level 2—Partial Automation
Level 3—Conditional Automation
Level 4—High Automation
Level 5—Full Automation Though the levels usually refer to vehicles such as cars, they can also be used in the context of the mobile robot. That is, Level 0 can correspond to a remote terminal fully controlling the robot. Levels 1-4 can correspond to the remote terminal partially controlling the robot, that is, monitoring the robot, stopping the robot or otherwise assisting the robot with the motion. Level 5 can correspond to the robot driving autonomously without being controlled by a remote terminal such as a server or a remote operator (in this case, the robot can still be in communication with the remote terminal and receive instructions at regular intervals).

Figure 7:
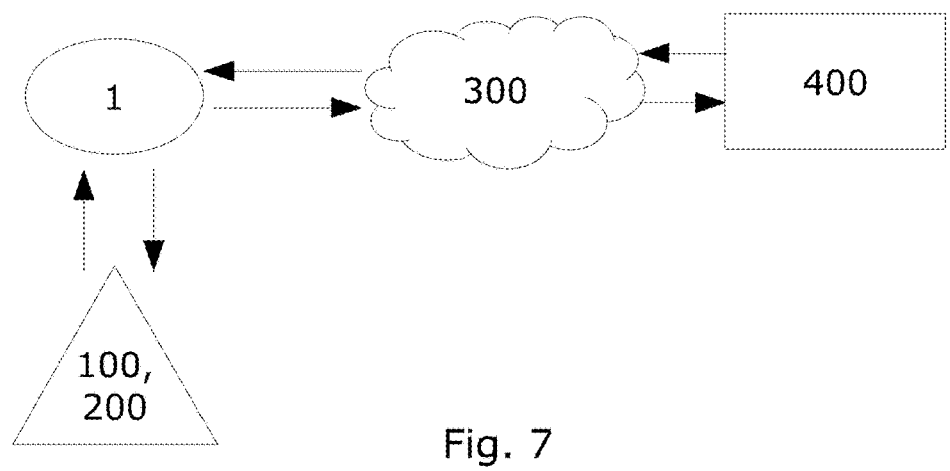
FIG. 7 schematically depicts an embodiment of a system for execution of delivery tasks according to one aspect of the invention.

FIG. 7 schematically depicts a system for execution of delivery tasks in a dynamic environment according to one aspect of the invention. The mobile robot 1 is shown during an encounter and/or an interaction with a actor 100 and/or a recipient 200. As described above, the mobile robot 1 can execute various actions and, optionally, convey its intent regarding the actions to be executed to the actor and/or the recipient. When detecting that the actor and/or the recipient either did not understand the robot's intent and/or continues the interaction regardless, the mobile robot 1 can request further assistance. The robot 1 can contact a central server 300 with a query for assistance. The central server 300 can either attempt to resolve the encounter automatically if further engagement options are available and/or it can contact an operator terminal 400. The operator terminal 400 can be manned by an operator, which can interfere if requested to do so during an encounter between the mobile robot 1 and one of the actor and the recipient.

For example, the mobile robot 1 might be travelling on a pedestrian sidewalk. A curious passersby may want to inspect the mobile robot and blocks its path. The robot might first signal its intent to continue travelling, for example, by emitting sounds associated with impatience and/or flashing warning lights. If the passersby continues to interact with the robot 1, the robot 1 can contact the central server 300 for further instructions. The central server can have more processing power than the robot, and may issue further instructions based on own analysis of the situation. For example, the server 300 might instruct the robot to play a recorded message, such as "please let me pass". Additionally or alternatively, the server might contact the operator terminal 400. If an operator terminal 400 is contacted, the operator manning the terminal might engage in conversation with the passersby via the robot's sound emitting component. The robot might further comprise a microphone to allow for two-way communication and/or for the operator terminal 400 to receive the surrounding sounds of the robot.

FIGS. 8 to 11 schematically depict various possible interaction models between the mobile robot and actors it encounters.

Figure 8:
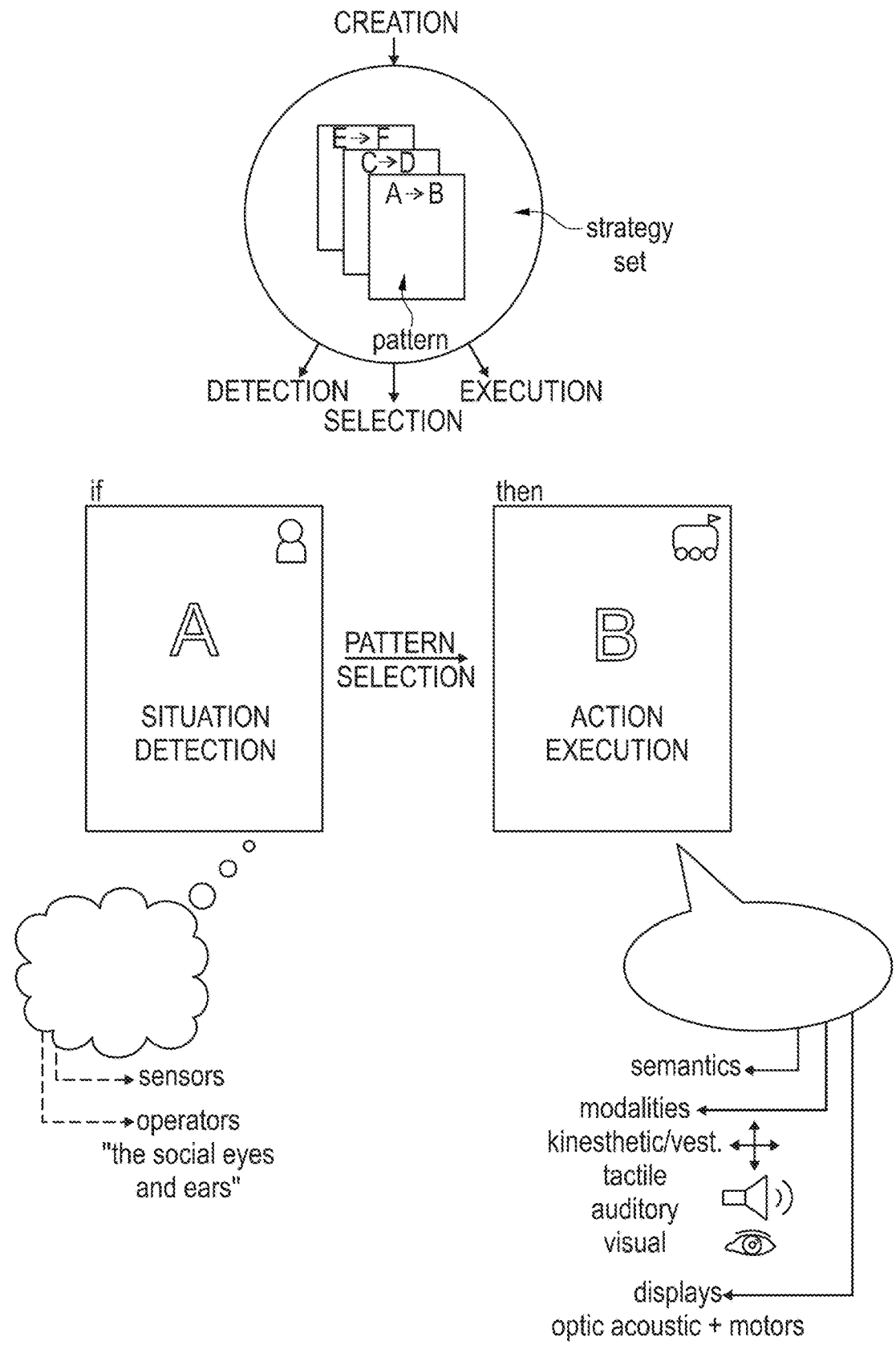
FIG. 8 schematically depicts an embodiment of an interaction with an actor.

FIG. 8 schematically shows a framework for an interaction between a mobile robot and an actor. First a database or a set comprising different possible interactions is created. This can be referred to as a "strategy set" for the mobile robot interactions. Once a situation is encountered (that is, detected) by the mobile robot, it can access the strategy set to determine an appropriate action to execute in the specific situation. Detection of the situation may be performed via the mobile robot's sensors and/or with assistance of remote operators. The execution of an appropriate action in response to an encountered situation may comprise different types of communication. In other words, different modalities may be used by the robot (e.g. kinesthetic, tactile, auditory, visual) and different means or displays can be used to convey the modalities. The action can be performed via one or more channels, be mono- and/or multi-modal, be a sequence (depending of the situation context and interaction) of actions performed over time or the like. The purpose may be to form implicit or explicit interaction (foreground, background, proactive, reactive).

Figure 9:
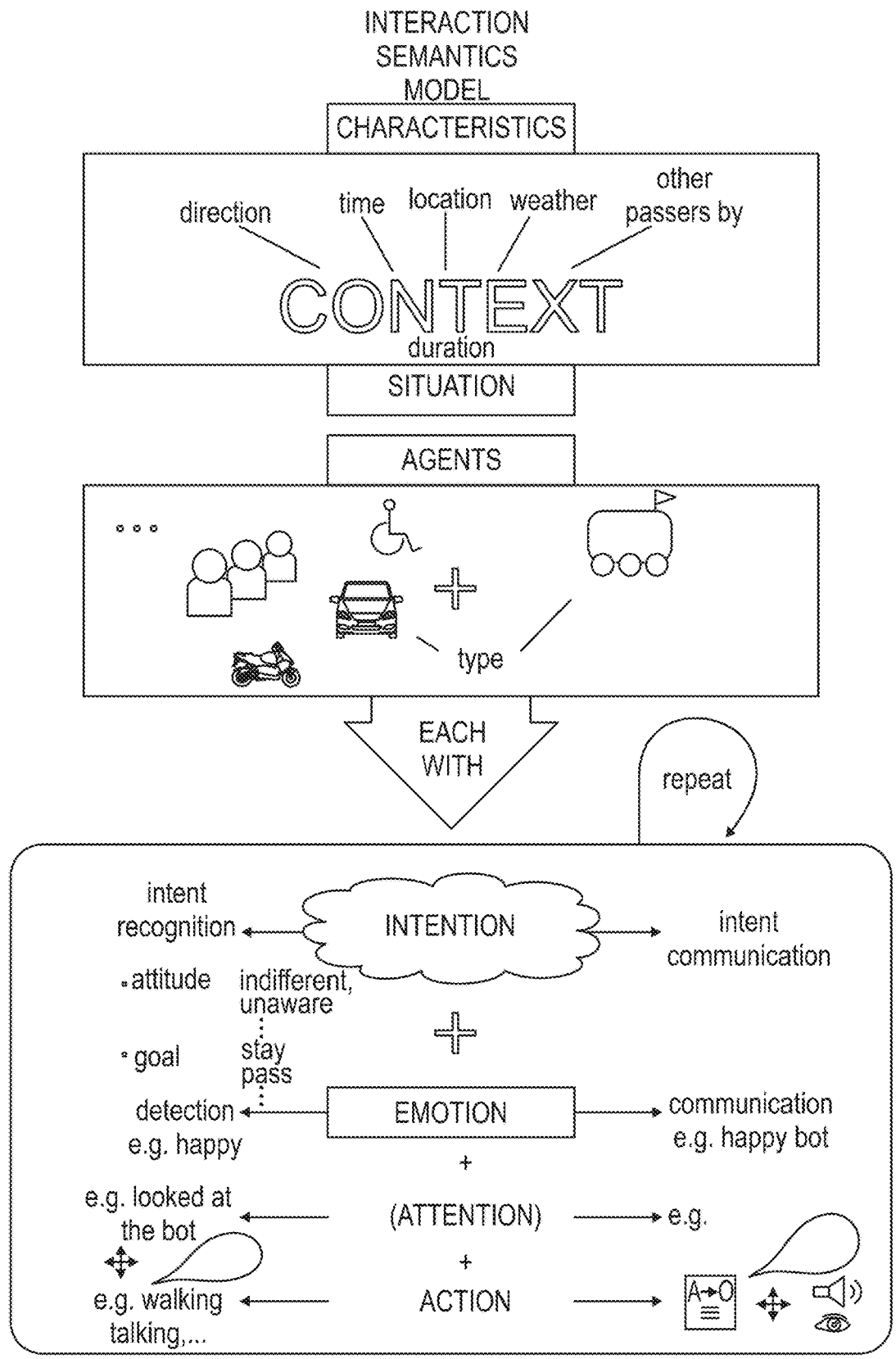
FIG. 9 depicts an exemplary embodiment of detecting particular situations.

FIG. 9 presents more detail on detecting and recognizing a particular situation. Context of a situation can be used to appropriately identify it. That is, time, location, weather, presence of multiple actors (or passersby) and the like can all be used as input variables into identifying a situation. Agents present close to the mobile robot can be identified and categorized as pedestrians, vehicles (and/or drivers of vehicles), cyclists, animals, other mobile robots or the like. Each agent may be assigned a likely intention (such as pass by, interact with the robot, or the like). Further, emotions, attention or actions of the actors may also be evaluated.

Figure 10:
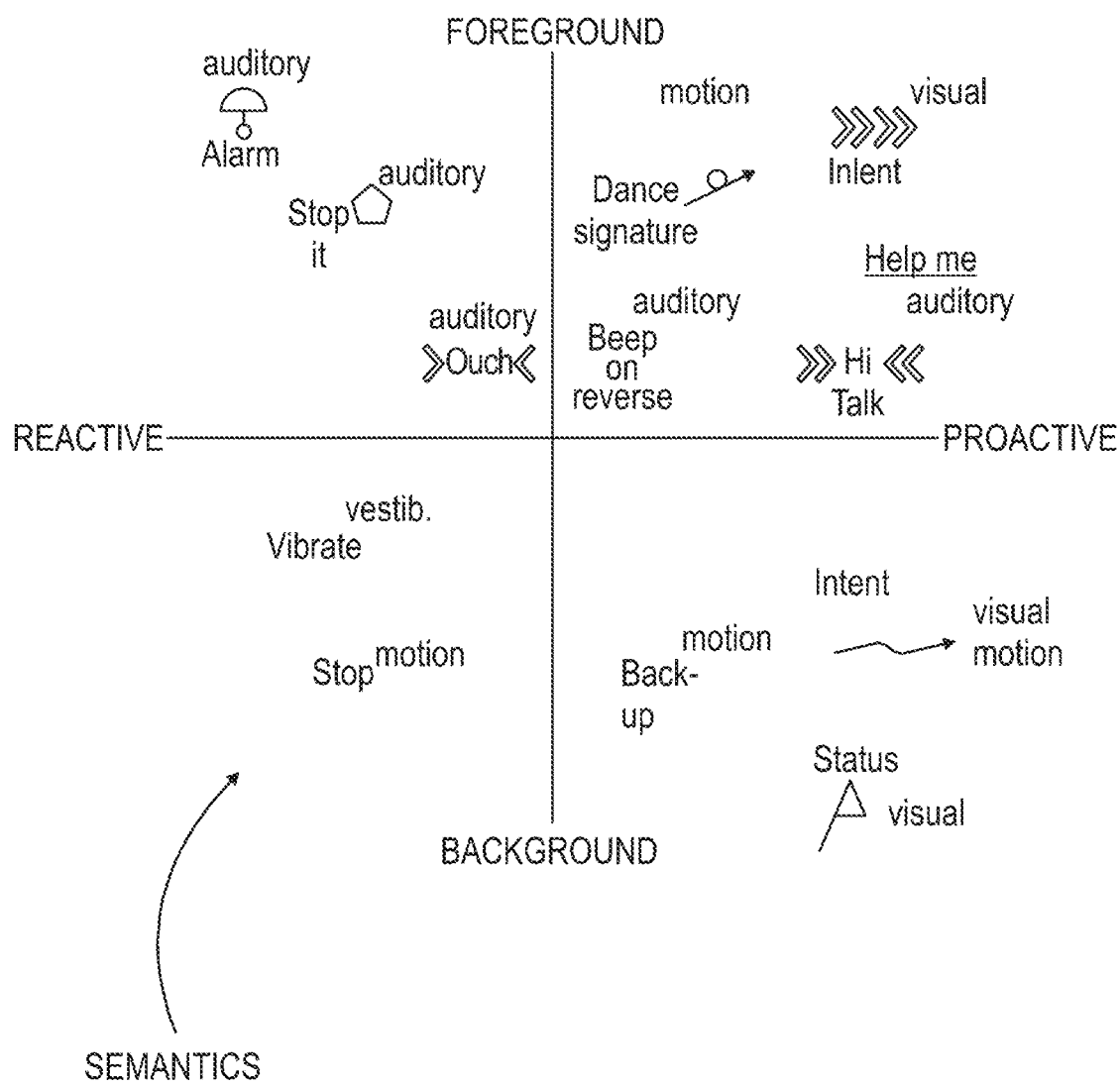
FIG. 10 depicts an exemplary embodiment of types of actions in response to situations.

FIG. 10 shows different communication modalities and channels that can be used as part of an action in response to an identified situation (based partially on Ju 2015). Various types of communication/actions are displayed on two axes: as more reactive or proactive and as more background or foreground types. For example, a robot stuck due to an obstacle may request help from passersby (actors) by an auditory signal emitting "help me". This would constitute a proactive and foreground interaction. On the other hand, if a robot stops in response to a passerby adjusting their trajectory, this may constitute a more background and reactive type of communication/action. In another example, a proactive interaction may be the robot emitting a "no!" sound when confronted with a person about to flip it over (so as to attempt to prevent such an action). On the other hand, a reactive interaction may comprise the robot saying "ouch" if a person kicks or flips the robot over.

Figure 11:
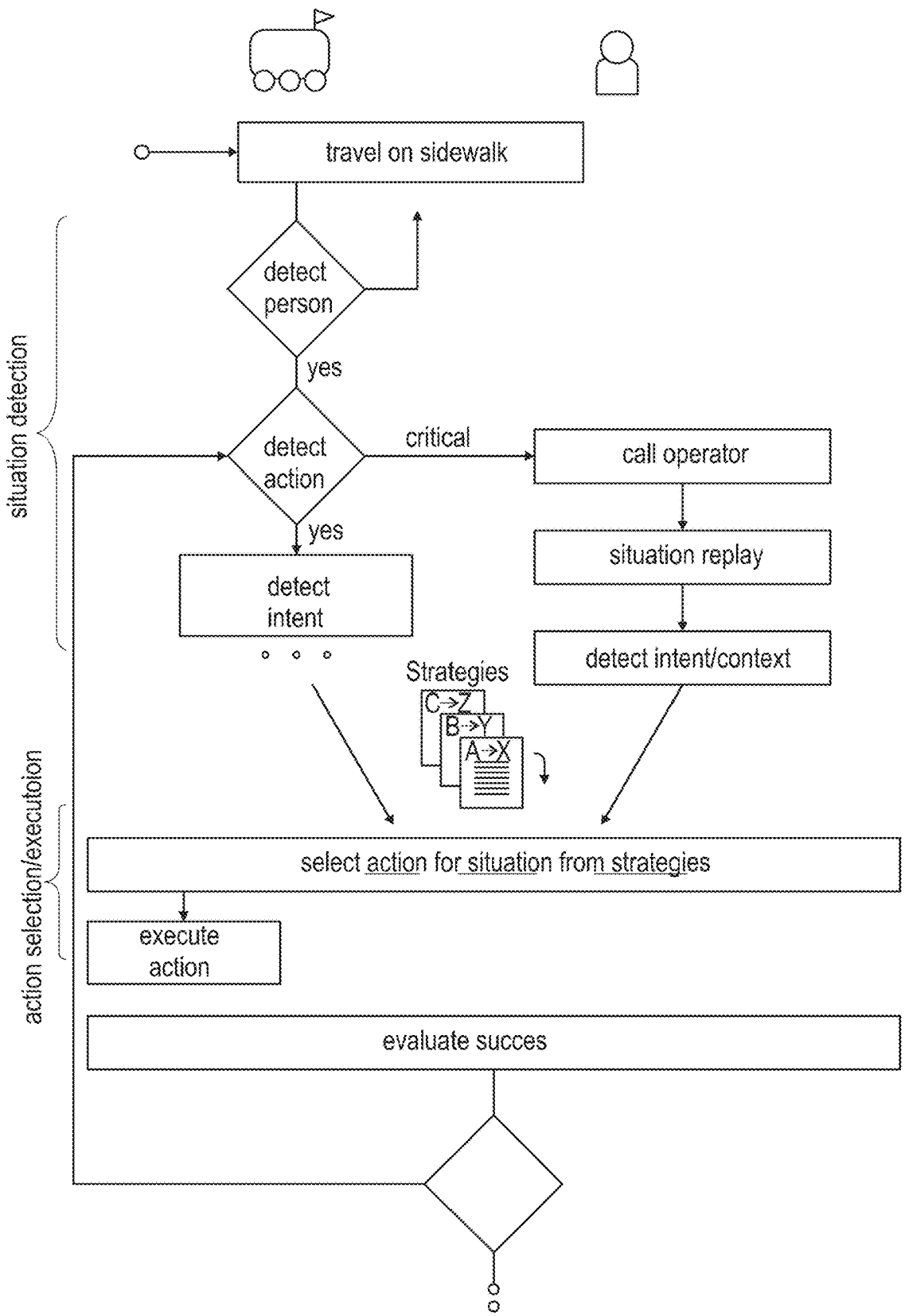
FIG. 11 schematically depicts an embodiment of a method of operation of a mobile robot.

FIG. 11 schematically depicts a method for mobile robot operations among various actors. The robot may travel on a sidewalk as part of a trip to transport items (such as food delivery for instance). The robot may then detect and identify a situation. This can comprise detecting a person (actor), detecting an action performed by the person and detecting (or estimating) the intent of the person. Based on the situation detection and evaluation, the robot may then select an action to execute in response. This can be based on the strategy set that may be stored directly on the robot's memory and/or remotely with the robot having access to it. In case of critical actions performed by an actor (for instance, picking up the robot), the robot may automatically contact a remote operator without further identifying the situation. The remote operator may then either select actions for the robot to perform, or serve as an extension of the sensor system of the mobile robot. The latter case would involve the remote operator interpreting the situation or adding inputs to help the mobile robot interpret the situation (via an operator terminal). For example, this can comprise the remote operator interpreting speech or facial expressions of the actors around the mobile robot. Having performed the determined action in response to a particular situation, the mobile robot may then further evaluate the success of the action. For example, if the robot stopped to let a passerby pass, such an evaluation may comprise assessing whether travel may be resumed.

While in the above, an exemplary embodiment has been described with reference to the accompanying drawings, the skilled person will understand that this embodiment was provided for illustrative purpose only and should by no means be construed to limit the scope of the present invention, which is defined by the claims.

Whenever a relative term, such as "about", "substantially" or "approximately" is used in this specification, such a term should also be construed to also include the exact term. That is, e.g., "substantially straight" should be construed to also include "(exactly) straight".

Whenever steps were recited in the above or also in the appended claims, it should be noted that the order in which the steps are recited in this text may be the preferred order, but it may not be mandatory to carry out the steps in the recited order. That is, unless otherwise specified or unless clear to the skilled person, the order in which steps are recited may not be mandatory. That is, when the present document states, e.g., that a method comprises steps (A) and (B), this does not necessarily mean that step (A) precedes step (B), but it is also possible that step (A) is performed (at least partly) simultaneously with step (B) or that step (B) precedes step (A). Furthermore, when a step (X) is said to precede another step (Z), this does not imply that there is no step between steps (X) and (Z). That is, step (X) preceding step (Z) encompasses the situation that step (X) is performed directly before step (Z), but also the situation that (X) is performed before one or more steps (Y1), . . . , followed by step (Z). Corresponding considerations apply when terms like "after" or "before" are used.

The invention claimed is:

1. A method for interaction between a mobile robot and an actor,
   the mobile robot including (i) a navigation component configured for at least partially autonomous navigation in an outdoor environment; (ii) a sensor system configured for collecting sensor data during an encounter between the mobile robot and an actor; (iii) a processing component configured to process the sensor data and output actions for the mobile robot to perform; and (iv) an output component configured for executing actions determined by the processing component,
   the method comprising:
   (A) the mobile robot travelling on a pedestrian pathway;
   (B) detecting an actor by the mobile robot via the sensor system;
   (C) the processing component identifying a situation associated with the actor detected by the mobile robot in (B);
   (D) in response to the situation identified in (C), the processing component determining one or more actions to be executed by the mobile robot; and then
   (E) the mobile robot executing the one or more actions determined in (D).

2. The method according to claim 1, wherein detecting an actor comprises determining a type of actor, the type comprising at least one of:
   a traffic participant; and/or
   a user of mobile robot services.

3. The method according to claim 1, wherein identifying a situation comprises determining at least one of:
   an intent of the actor; and/or
   an emotional state of the actor; and/or
   a directed attention of the actor; and/or
   an action performed by the actor.

4. The method according to claim 3, wherein determining at least one of the intent, the emotional state and/or the directed attention of the actor comprises analyzing at least one action comprising at least one of verbal and motor behavior of the actor.

5. The method according to claim 4, wherein the method further comprises computing at least one of situation certainty and/or a risk level to the mobile robot based on at least one action performed by the actor.

6. The method according to claim 1, further comprising, following detecting an actor, communicating with the actor to indicate successful detection, wherein communicating with the actor comprises at least one of:
   auditory communication; and/or
   visual communication; and/or
   motion-based communication.

7. The method according to claim 1 further comprising the step of communicating intent to execute the determined action to the actor by the mobile robot before the mobile robot executes the determined action.

8. The method according to claim 7, wherein communicating intent comprises at least one of:
   emitting an auditory signal; and/or
   emitting a visual signal; and/or
   performing a predetermined motion.

9. The method according to claim 1, further comprising, following execution of the determined action, determining a status of the situation associated with the actor as an ongoing situation or a resolved situation.

10. The method according to claim 9, wherein the mobile robot uses the sensor system to determine whether a further action is needed to resolve the situation associated with the actor.

11. The method according to claim 9, wherein, in case of an ongoing situation, at least one of the following is performed:
   (i) a new action to execute is determined, and the new action is executed; and/or
   (ii) an operator terminal is notified.

12. The method of claim 1, wherein the one or more actions determined in (D) comprise one or more of: (i) the mobile robot emitting sound, (ii) the mobile robot emitting light, and (iii) the mobile robot performing a certain motion.

13. The method of claim 1, wherein the one or more actions comprise the same action performed multiple times and/or a combination of actions performed simultaneously.

14. A mobile robot configured for execution of delivery tasks in an outdoor environment, comprising
   a navigation component configured for at least partially autonomous navigation in outdoor environment;
   a sensor system configured for collecting sensor data during an encounter between the mobile robot and an actor;
   a processing component configured to process the sensor data and output actions for the mobile robot to perform; and
   an output component configured for executing actions determined by the processing component.

15. The mobile robot according to claim 14 configured to communicate with actors comprising at least one of traffic participants and recipients in order to execute item deliveries.

16. The mobile robot according to claim 14, wherein the sensor system is configured to adjust sensor parameters during the encounter between the mobile robot and an actor.

17. The mobile robot according to claim 14, wherein the processing component is configured to detect and recognize actions taken by the actor based on the sensor data.

18. The mobile robot according to claim 14, wherein the processing component is configured to analyze the trajectory of an actor travelling in the vicinity of the mobile robot, and wherein the processing component is configured to adapt the mobile robot's trajectory when detecting an intersection with a trajectory of the actor.

19. The mobile robot according to claim 14, wherein the output component is configured to communicate intent of the mobile robot to the actor.

20. A system for execution of delivery tasks in a dynamic environment, the system comprising:
   a mobile robot configured for execution of delivery tasks in an outdoor environment, the mobile robot comprising:
   a navigation component configured for at least partially autonomous navigation in outdoor environment;
   a sensor system configured for collecting sensor data during an encounter between the mobile robot and an actor;
   a processing component configured to process the sensor data and output actions for the mobile robot to perform; and
   an output component configured for executing actions determined by the processing component;
   a central server; and
   an operator terminal,
   wherein the central server is configured to communicate with the mobile robot and the operator terminal, and
   wherein the mobile robot is configured to request assistance when an interaction between the mobile robot and an actor cannot be concluded by the mobile robot, and
   wherein the central server is configured to evaluate an assistance request and, if deemed necessary, forward the assistance request to an operator terminal for further evaluation.

\* \* \* \* \*